United States Patent [19]

Cooper et al.

[11] 4,167,066

[45] Sep. 11, 1979

[54] AUTOMATIC INSPECTION APPARATUS

[75] Inventors: Leslie E. Cooper, Kent; Glenn A. Geitham, Renton, both of Wash.

[73] Assignee: The Boeing Company, Seattle, Wash.

[21] Appl. No.: 896,488

[22] Filed: Apr. 14, 1978

[51] Int. Cl.² .............................................. G01B 7/28
[52] U.S. Cl. .................................................. 33/174 P
[58] Field of Search ........... 33/174 PC, 174 P, 174 Q, 33/174 L, 169 R, 1 M, 23 K, 178 E

[56] References Cited

U.S. PATENT DOCUMENTS

| | | | |
|---|---|---|---|
| 2,831,258 | 4/1958 | Eisele | 33/174 Q |
| 3,206,857 | 9/1965 | Kaye | 33/174 PC |
| 3,279,079 | 10/1966 | Schiler | 33/169 R |
| 3,531,868 | 10/1970 | Stevenson | 33/174 P |
| 3,750,295 | 8/1973 | Nordmann | 33/174 L |

OTHER PUBLICATIONS

Tape Controlled "Inspector" by William M. Stocker, American Machinist, 2/9/59, 101–103.

*Primary Examiner*—Harry N. Haroian
*Attorney, Agent, or Firm*—Christensen, O'Connor, Johnson & Kindness

[57] ABSTRACT

An automatic inspection system for evaluating dimensional and geometrical characteristics of apertures or bores within production parts is disclosed. The system includes a profile sensor, having an outwardly extending probe, that is mounted to a probe manipulator. The probe manipulator is configured for moving the profile sensor so that the tip of the probe moves along axial and circumferential paths of a cylindrical scanning sequence in which the probe tip traces out geometrical elements along the interior contour of the aperture. As the probe tip is moved through the scanning sequence, signals representative of the circumferential and axial position of the probe tip and the radial deflection of the probe tip are periodically supplied to a control circuit that converts these signals to a digital format and controls movement of the probe through the next portion of the scanning sequence. The digit signals, which represent the cylindrical coordinates of various points on the interior surface of the aperture, are coupled to a computational unit that arithmetically determines the value of each geometrical and dimensional characteristic of interest, compares the computed values with permissible tolerances or limits, and supplies a visual indication or permanent record of the evaluation results.

15 Claims, 16 Drawing Figures

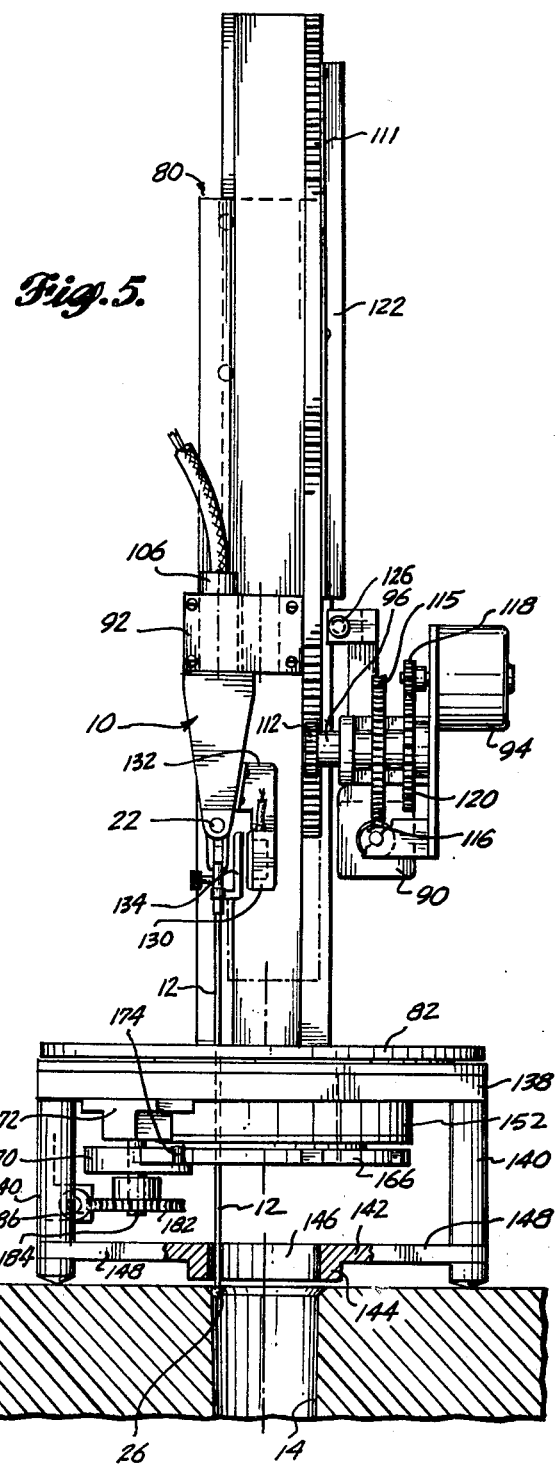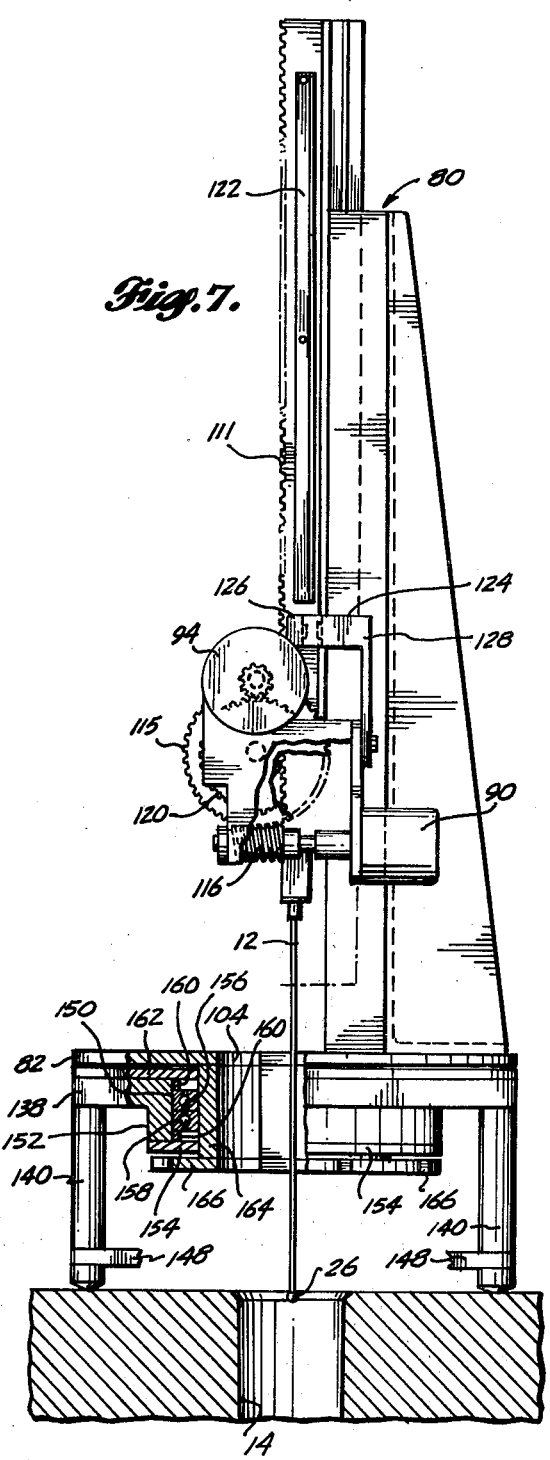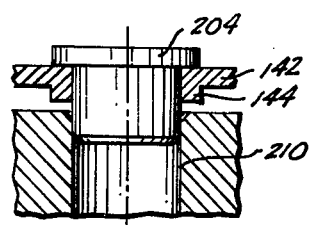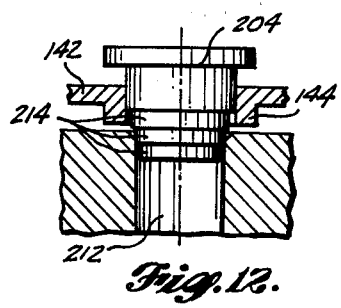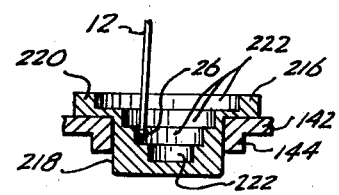

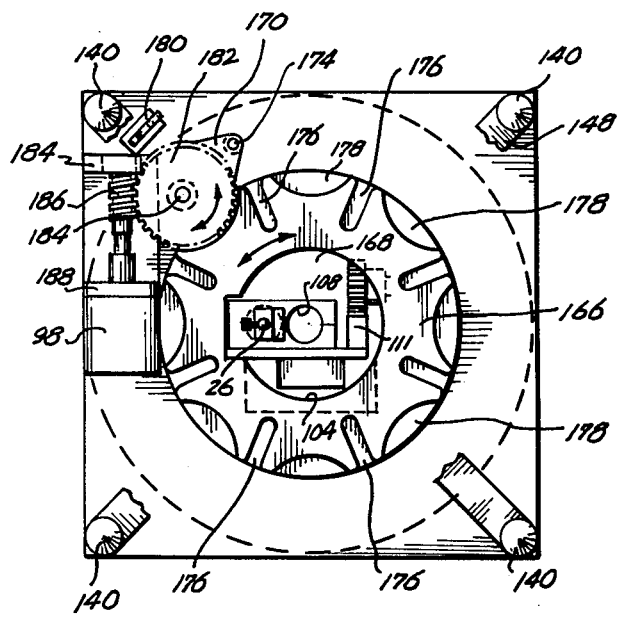
Fig. 8.
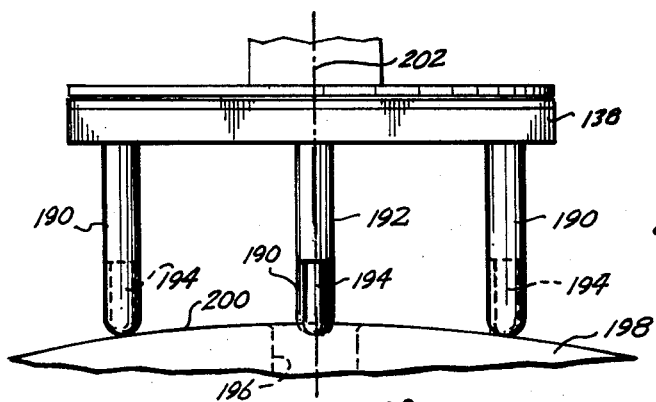
Fig. 9.
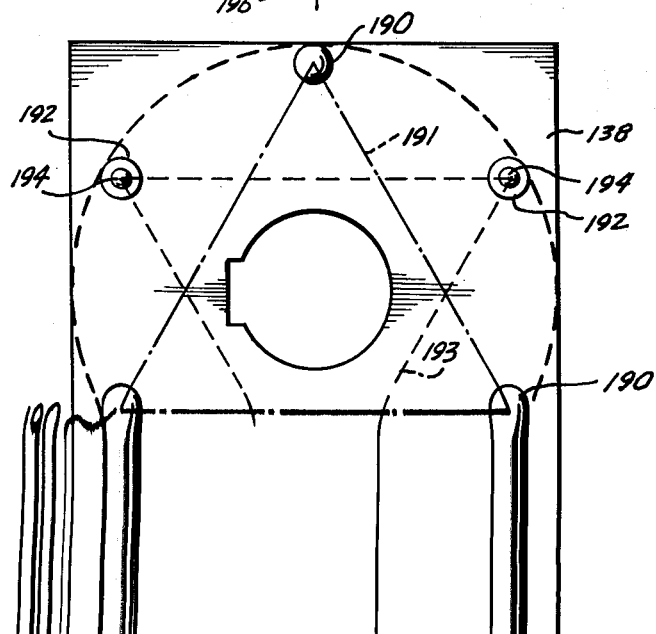

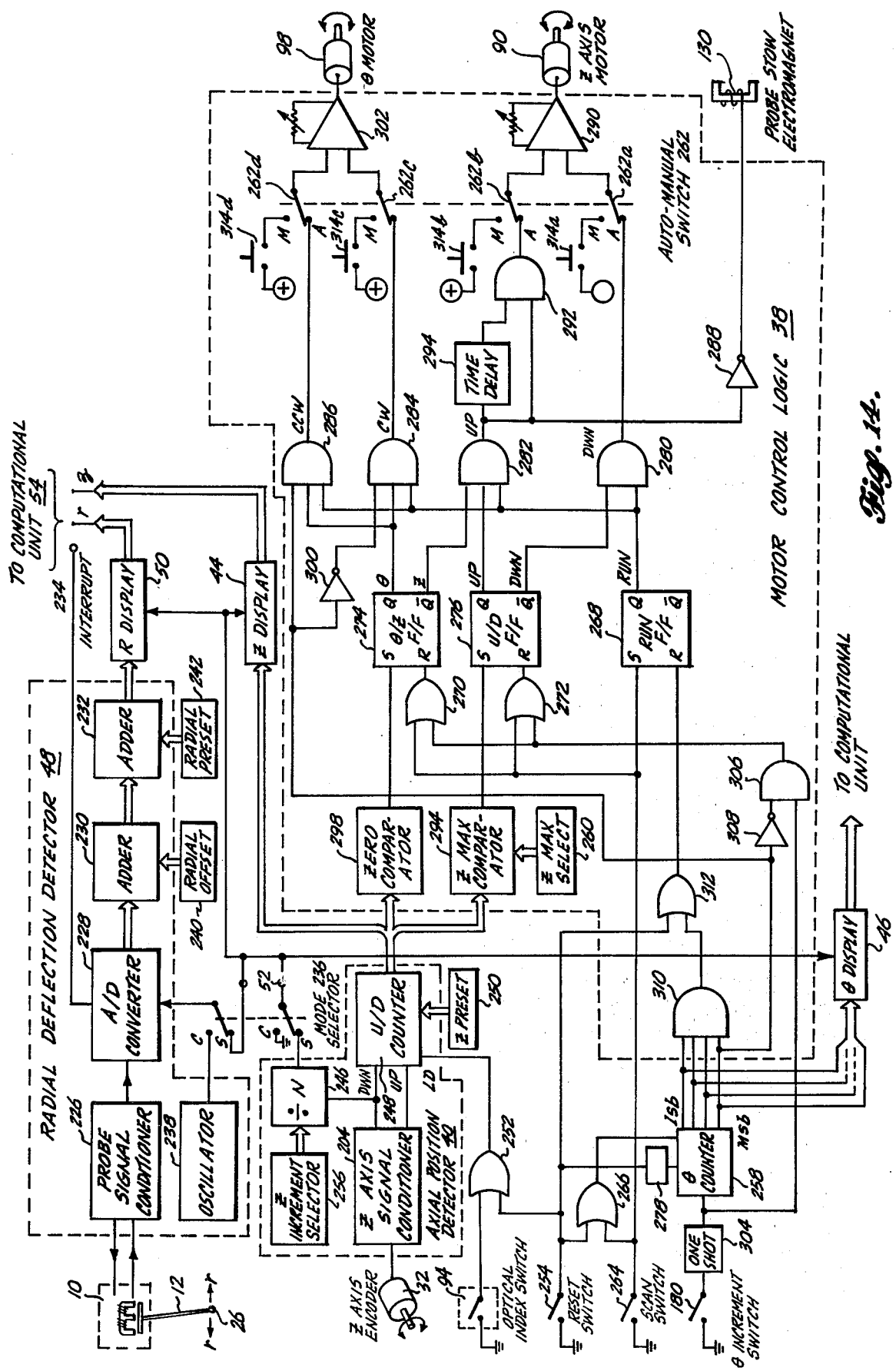

AUTOMATIC INSPECTION APPARATUS

The invention herein described was made in the course of Contract No. F33615-76-C-5283 with the United States Air Force.

BACKGROUND OF THE INVENTION

This invention relates to the nondestructive evaluation of geometrical characteristics of machined parts. More particularly, this invention relates to apparatus for the dimensional inspection of apertures or holes within production parts to determine whether such apertures comply with various geometric and dimensional design constraints or tolerances.

In many situations, it is necessary to precisely bore or otherwise machine apertures or holes into or through a production workpiece or part such that the various geometric and dimensional characteristics of the aperture do not deviate from nominal or ideal values by more than a predetermined amount. Such geometrical and dimensional characteristics include, for example, the size of an aperture (e.g., diameter at the surface of the workpiece or any other reference plane), contour of the aperture walls (e.g., axial straightness and taper or other various profile characteristics), cross-sectional geometry of the aperture in one or more reference planes (e.g., roundness) and orientation of the axial centerline of the aperture relative to the workpiece or other reference (e.g., perpendicularity). Since the acceptability and reliability of a finished product that incorporates a component containing precisely formed apertures can be affected if the apertures do not conform to design objectives, it is often necessary to perform a detailed inspection of such apertures prior to utilizing a component part in which they are formed. Where a number of geometrical and dimensional characteristics are important and/or a large number of apertures must be evaluated, such inspection is not only a time-consuming and expensive task, but, when performed by conventional manual measurement techniques, is subject to error.

One situation which necessitates apertures or holes that exhibit very precise dimensional and geometrical characteristics relates to tapered fastener systems of the type utilized to join structural components in aircraft and other stuctures that are subject to substantial operational stress and strain. In this regard, conventional tapered fasteners are precisely dimensioned and require apertures of corresponding preciseness so that, when the fastener is drawn into an aperture, a controlled amount of interference occurs between the fastener and the wall of the aperture. This interference produces compressive stress which joins the components together in a manner that provides high resistance to structural fatigue and thereby extends the service life of the assembled parts over that which would result through the use of other conventional fastening techniques.

To ensure that the advantages of such a tapered fastener system are achieved, it is generally necessary to evaulate several geometrical and dimensional characteristics of apertures that are to receive tapered fasteners. In this respect, geometrical characteristics such as the eccentricity or roundness of the aperture, the taper and straightness of axial elements within the interior walls of the aperture and the orientation of the aperture axial centerline relative to the surface of the part must be determined as well as the diameter of the aperture relative to various cross-sectional datum planes.

Although various prior art measurement apparatus and techniques have been utilized in the inspection or evaluation of apertures for tapered fasteners, these apparatus and techniques have not provided a quantitative evaluation of all the important aperture characteristics and, further, serious limitations have been encountered. For example, in one inspection technique known as a "blue pin bearing check", a precisely dimensioned tapered pin of a size that corresponds to the type of tapered fastener opening being inspected is coated with a slow-drying blue dye material and the pin is inserted into the aperture to be inspected and pushed or driven inwardly so that it positively contacts the wall of the aperture. The pin is then removed and rolled on a piece of white paper to remove any dye that remains on the pin. The amount of dye that is transferred to the taper is evaluated by the person performing the inspection, e.g., by comparing this particular dye sample with a set of reference samples, to thereby provide an indication of the amount of bearing area existing between the tapered pin and the aperture being inspected and hence the percent of surface area where interference will occur when a tapered fastener is installed in the aperture. Additionally, a technique known as "head protrusion gauging" has been utilized wherein specially dimensioned protrusion gauges measure the protrusion of the head above the surface of the workpiece or production part where the fastener is inserted into an aperture just prior to installation. Such a technique is similar to the blue pin bearing technique except that it provides a qualitative indication of the amount of interference between the bolt and the aperture being inspected. Further, these techniques and others utilized heretofore not only require a substantial amount of subjective evaluation and experience on the part of the individual performing the inspection, but require a significant amount of time. For these and other reasons, prior art inspection apparatus and techniques for evaluating precisely machined apertures such as those for receiving tapered fasteners have not been totally satisfactory. This is especially true in production situations wherein a large number of such apertures must be machined and inspected within a reasonable amount of time and, insofar as possible, without requiring special skills and training not possessed by typical production and inspection personnel.

Accordingly, it is an object of this invention to provide an automatic inspection system for determining various geometrical and dimensional characteristics of apertures or bores contained in workpieces or production parts.

It is another object of this invention to provide an automatic inspection system of the above described type which can be utilized for rapid evaluation of apertures in a production environment.

It is yet another object of this invention to provide an inspection system for the evaluation of apertures in production parts wherein geometrical and dimensional data is automatically gathered and evaulated within digital computation apparatus.

SUMMARY OF THE INVENTION

These and other objects are achieved in accordance with this invention by an automatic inspection system wherein a profile sensor having an outwardly extending deflectable probe is mounted to a probe manipulator that automatically moves the profile sensor probe through a scanning sequence in which the tip of the probe traces out predetermined paths along the interior wall of the aperture being inspected. As the probe tip is moved through the scanning sequence, signals representative of the cylindrical coordinates of various points on the wall of the aperture are supplied to a manipulator control/signal processor unit. The manipulator control/signal processor unit operates in conjunction with the probe manipulator to form a sample data system in which digital signals, representative of the cylindrical coordinates of predetermined sample points on the interior of the aperture, are supplied to a computational unit. Additionally, the manipulator control/signal processor includes logic circuits that move the probe through each portion of the predetermined scanning sequence. The computational unit, which is a conventional circuit arrangement such as a general purpose computer, a minicomputer or a microprocessor circuit, is arranged or programmed to determine various desired geometrical and dimensional characteristics of the aperture being inspected and to compare the computed characteristics with design values or tolerance limits to thereby determine the acceptability of each inspected aperture.

In each disclosed embodiment of the invention, the profile sensor includes a linear variable differential transformer mechanically coupled to an outwardly extending pivotable probe. The profile sensor is mounted to the central portion of a ball slide assembly that is affixed to a beam that extends vertically upward from a plate. This plate is rotatably affixed to the probe manipulator base unit with the profile sensor probe extending downwardly through a central opening in the rotatable plate and base unit. To selectively position the probe tip in the vertical direction (z direction), the ball slide assembly is driven through a rack and pinion drive by a reversible DC motor. A rotary encoder, geared to the rack and pinion drive, supplies an electrical signal as the DC motor drives the profile sensor upwardly and downwardly which indicates the vertical or z position of the probe tip.

To provide circumferential scanning of the aperture being inspected, the rotatable plate is driven by a second DC motor which causes the probe tip to move through a circular pattern as the motor turns the rotatable plate. In one particular embodiment described herein, the DC motor operates a conventional Geneva stop mechanism that is mounted to the lower portion of the rotatable plate to move the rotatable plate and a probe tip through a predetermined angle, $\Delta\theta$, each time the DC motor is activated. In this arrangement, a switch that is mounted to the probe manipulator base unit is operated each time the geneva stop mechanism moves the probe through the predetermined angle $\Delta\theta$ and a counter circuit, connected to the switch, supplies a signal indicative of the probe tip circumferential position ($\theta$ position).

In operation, the probe manipulator is positioned above a vertically extending aperture that is to be inspected and selector-switches are set that determine the maximum probe penetration and the vertical increment between sampling points. When the operator initiates the automatic scanning sequence, the DC motors are operated by logic circuits within the manipulator control/signal processor unit to cause the probe tip to sequentially trace out circumferential and axial elements of the aperture profile with the logic circuits sypplying a periodic strobe pulse that causes digital signals representative of the radial deflection of the probe tip and the z and $\theta$ positions to be supplied to the system computational unit.

When a scanning sequence has been completed, the data supplied to the computational unit constitutes the spatial coordinates of a "skeletal" framework of points in space that lie on the interior of the aperture being inspected. Utilizing various known arithmetic algorithms and logic, the computational unit then determines the various geometrical and dimensional characteristics of interest and compares the computed values with nominal or design values to determine the acceptability of the aperture. Preferably, the computational unit supplies a permanent inspection record which indicates each unacceptable dimension or characteristic of each inspected aperture.

In one disclosed arrangement of the system for evaluating precisely machined apertures that are dimensioned to receive tapered fasteners, a scanning sequence is employed in which the probe tip is inserted a selectable distance into the aperture being inspected, withdrawn from the aperture with the probe tip containing the interior wall, rotated along the periphery of the aperture by the predetermined angle $\Delta\theta$, reinserted in the aperture and again withdrawn with the sequence continuing until the entire aperture is scanned and the probe is rotated back to its initial angular position. Each time the probe is withdrawn from the aperture, the probe tip effectively traces out one axial element of the aperture interior profile and the manipulator control/signal processor unit causes digital signals representative of this axial element to be made available to the system computational unit at selectable sampling increment $\Delta z$. In this arrangement, the system computational unit is programmed to calculate actual dimensional and geometrical characteristics of the aperture such as diameters at predefined depths, roundness, straightness of each axial element, taper, and orientation of the axial centerline of the aperture relative to the surface of the profuction part. The actual values are then compared with nominal values and acceptance limits which are stored within the computing apparatus and the system indicates whether or not the inspected aperture is acceptable.

To prevent damage to the probe, the manipulator control/signal processor unit also supplies a signal which causes the probe to be stowed in a noncontacting position during all portions of the scanning sequence except when the probe is being moved upwardly to gather coordinate data. Additionally, an up/down counter circuit is utilized in this embodiment of the invention to provide a signal representative of the z position of the probe. This counter, which is responsive to the signal supplied by the probe manipulator rotary encoder, is reset to a predetermined count each time the probe tip passes through a corresponding reference position by means of an optical index switch that is mounted to the central portion of the ball slide assembly. To provide control signals to the manipulator control/signal processor each time the probe reaches the point of maximum penetration and the upper terminus of the aperture, the signal provided by the up/down counter is compared with a selected maximum Z value and the value of zero. Further, to provide the system sampling signal, this embodiment of the invention includes a programmable divide-by-n counter that supplies a signal to the manipulator control/signal processor each time the probe tip is moved upwardly by the amount $\Delta z$.

BRIEF DESCRIPTION OF THE DRAWINGS

A better understanding of the present invention can be derived by reading the ensuing specification in conjunction with the accompanying drawing wherein:

FIG. 5 is a front elevation view of the probe manipulator depicted in FIG. 4;

FIG. 7 is a side elevation view of the probe manipulator depicted in FIGS. 4–6.

FIG. 8 is a bottom view of the probe manipulator of FIGS. 4–7;

FIGS. 9 and 10 depict an alternative base arrangement for the probe manipulator of FIGS. 4–8;

FIGS. 11 and 12 depict centering plugs that can be utilized with the probe manipulator of FIGS. 4–8 for aligning the probe manipulator with an aperture to be inspected;

FIG. 13 depicts a calibration gauge that can be utilized with the probe manipulator of FIGS. 4–8 to verify operation of an inspection system constructed in accordance with this invention;

FIG. 14 is a more detailed diagram that depicts the control and signal circuitry utilized in an inspection system constructed in accordance with this invention; and, FIG. 15 is an operational flow chart that depicts a computational sequence utilized in one embodiment of this invention for inspecting apertures of the type depicted in FIG. 3.

DETAILED DESCRIPTION

Figure 1:
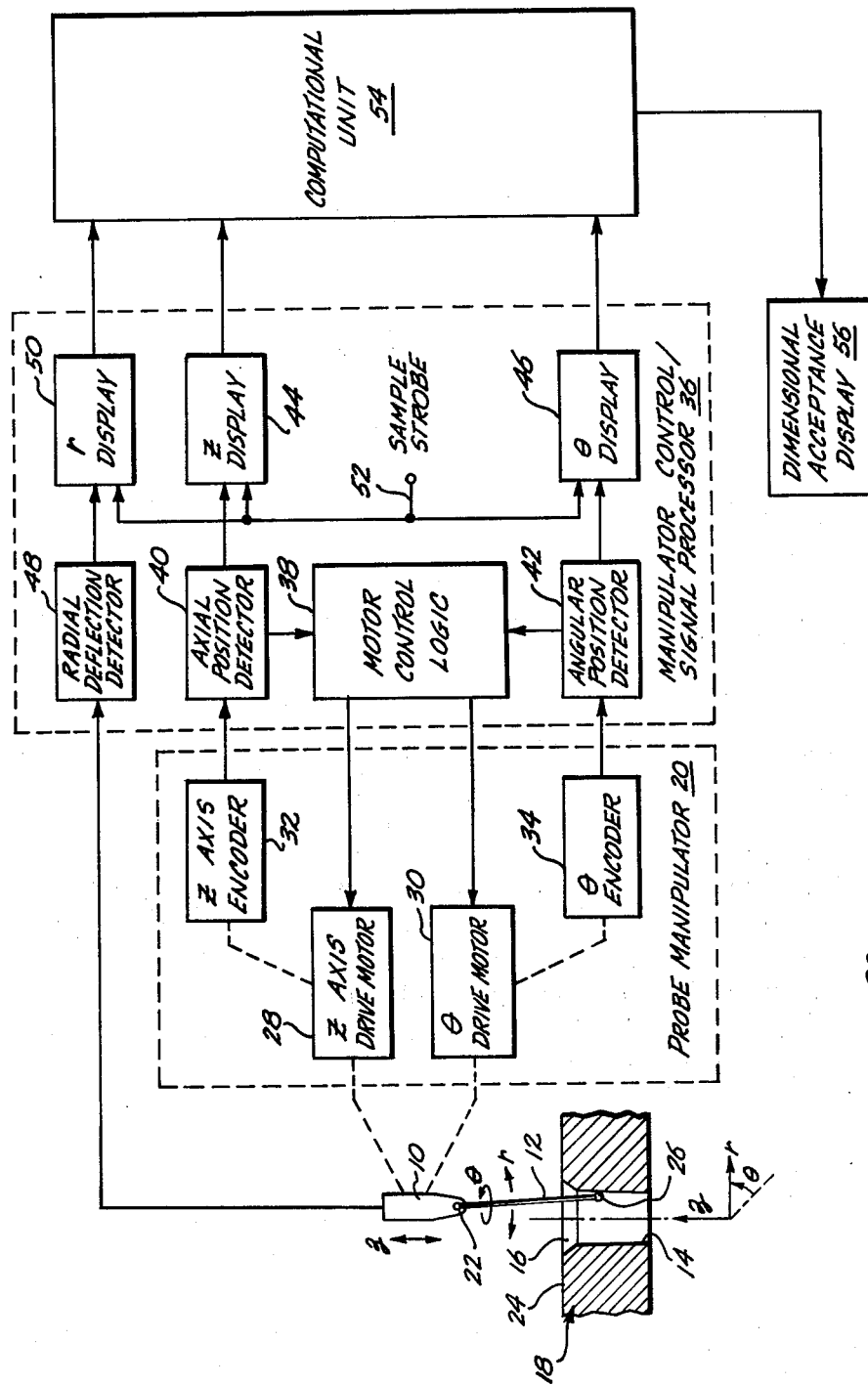
FIG. 1 is a block diagram of the inspection system of this invention.

With reference to FIG. 1, the inspection system of this invention includes a profile sensor 10 having a downwardly extending probe 12 which contacts the interior wall 14 of an aperture or hole 16 in a production part or workpiece 18 as the profile sensor 10 is moved through a predetermined scanning pattern by an electromechanical probe manipulator 20. Generally, the profile sensor 10 is a conventional profile tracer of the type in which the upper end of the probe 12 is pivotably attached to the body of the sensor 10 at a pivot point 22 with the probe being biased at a quiescent position by spring loading or other conventional techniques. A displacement transducer such as a linear variable differential transformer, located within the profile sensor 10 and mechanically linked to the probe 12, supplies an electrical signal representative of probe deflection relative to its quiescent position.

In accordance with this invention and as shall be described in detail hereinafter, the probe manipulator 20 is positioned on the workpiece 18 such that the profile sensor 10 is positioned above the aperture 16 that is to be inspected. The profile sensor 10 is then automatically moved through a predetermined scanning sequence in which the probe pivot point 22 traces out axial and circumferential elements of a right circular cylinder having an axis which passes orthogonally through the center of the opening defined in the workpiece upper surface 24 by the aperture 16. In embodiments of the invention that are configured for inspection of a variety of various diameter apertures, the diameter of the cylindrical surface traced out by the probe pivot point 22 during the scanning sequence is selectable in accordance with the radial dimension of the aperture 16 to thereby cause the probe tip 26 to bear against the interior wall 14 of the aperture 16.

More specifically, the probe manipulator 20 includes a z axis drive motor 28 that moves the profile sensor 10 upwardly and downwardly along vertical paths and a $\theta$ drive motor 30 that moves the profile sensor 10 through circular paths which lie in planes orthogonal to the vertical direction of travel. A z axis encoder 32 is structurally linked to the probe manipulator 20 to provide an electrical signal representative of the vertical position of the probe tip 26 (z axis position) and a $\theta$ encoder 34 is structurally linked to the probe manipulator 20 to provide an electrical signal representative of the circumferential position of the probe 26 ($\theta$ position). Since, in accordance with the present invention, the profile sensor 10 is mounted to the probe manipulator 20 so that the probe tip 26 contacts the aperture wall 14 at particular $\theta$ and Z positions of the scanning sequence, it can be recognized that, at each such point of the scanning sequence, the probe tip 26 is deflected by an amount equal to the difference between the radius of the cylindrical scanning pattern that would be traced out by the probe tip 26 if it were not deflected and the radius of the aperture 16 at that particular point of the scanning pattern. Accordingly, it can be seen that the profile sensor 10, $\theta$ encoder 34 and Z encoder 32 collectively supply signals representative of the cylindrical coordinates (r, $\theta$, and z) of points on the surface of the aperture wall 14 that are contacted by the probe tip 26 during each scanning sequence.

As is indicated in FIG. 1, these signals are supplied to a manipulator control/signal processor unit 36 which includes a motor control logic unit 38 for activating the z and $\theta$ drive motors (28 and 30) of the manipulator 20 so that the probe tip 26 is moved through a desired scanning pattern and includes circuitry for converting the r, $\theta$ and z signals into digitally encoded signals representative of the r, $\theta$ and z coordinates of points on the surface of the aperture wall 14. More specifically, the signals supplied by the z axis and $\theta$ encoders (32 and 34) are respectively coupled to an axial position detector 40 and an angular position detector 42 that respectively supply a digital signal to a z axis display unit 44 and a $\theta$ axis display unit 46. Additionally, both the axial position detector 40 and the angular position detector 42 supply control signals to motor control logic 38 which cause the motor control logic to advance the profile sensor 10 through the next portion of the probe scanning sequence. In a similar manner, the signals supplied by the profile sensor 10 is coupled to a radial deflection detector 48 that supplies a digitally encoded signal to an "r" display unit 50.

The display units 44, 46 and 50 are conventional devices such as suitable arrays of seven segment numerical readouts which visually indicate the r, $\theta$ and z coordinates of each sampled point on the surface of the aperture wall 14. In the arrangement of FIG. 1, the display units 44, 46 and 50 display the numerical value of the applied digitally encoded signal each time the display units are strobed or clocked by a strobe signal that is supplied to a sample strobe terminal 52. Since the display units continue to display applied signal information until the next strobe pulse is received, the display units not only provide visual information, but effectively serve as digital storage devices. As shall become apparent upon attaining a more complete understanding of the invention, the strobe signal can be supplied by either the axial position detector 40 or the angular position detector 42, depending on the scanning sequence employed in a particular embodiment of the invention or, alternatively can be supplied by a conventional oscillator or clock circuit. Further, it shall become apparent that digital display of the r, $\theta$ and z coordinates of each sample point on the surface of the aperture wall 14 is not essential to fully automatic embodiments of the invention. In such embodiments, conventional digital storage registers such as latch circuits can be substituted for the display units to store the current coordinate information. In either case, it can be recognized that profile sensor 10, manipulator 20 and manipulator control/signal processor 36 collectively operate as a sampled data system having a sampling rate determined by the pulse frequency of the signal applied to the sample probe terminal 52 to provide geometrical and dimensional data pertaining to the inspected aperture.

Regardless of whether the coordinate information is displayed by the display units 44, 46 and 50 or stored in conventional digital storage devices, the r, $\theta$ and z coordinate signals are coupled to a conventional computational unit 54 which is programmed to calculate various desired geometrical and dimensional characteristics of the interior profile of the aperture 16 and is programmed to compare the calculated characteristics with corresponding design objectives. For example, in the hereinafter described embodiment of the invention which is configured for dimensional evaluation of apertures for receiving tapered fasteners, the computational unit 54 is programmed to calculate the diameter of the aperture at various points along the axial direction, to determine eccentricity or roundness characteristics of the aperture at various points along the axial direction; to determine axial straightness of the aperture wall at various circumferential positions about the periphery of the aperture; to determine taper characteristics of the aperture relative to the axial direction; and, to determine the orientation of the aperture relative to the upper surface 24 of the workpiece 18 (i.e., "perpendicularity" of the axial centerline of the aperture). Each computed geometrical and dimensional characteristic of the aperture being inspected is then compared with desired limits or tolerances that are stored in computational unit 54 to determine acceptability of the aperture, with the computational unit 54 supplying signals to a dimensional acceptance display 56 which indicates the inspection results.

Various conventional apparatus is suitable for use as the computational unit 54. For example, the computational unit 54 can be a general purpose computer that is programmed with conventional software techniques or a special purpose computing arrangement that employs conventional circuits such as arithmetic logic units and combinatorial logic (e.g., conventional logic gates which are permanently interconnected to form the necessary calculations). Preferably, to provide a portable system which can be readily utilized within a production environment, the computational unit 54 is of the type commonly identified as a microprocessor or a microprocessor based minicomputer. As is known in the art, a microprocessor is a relatively small and simple arrangement of commercially available integrated circuits which is programmed with a set of instructions that is stored in a read only memory (ROM) circuit and/or is programmed through conventional software techniques.

Like the computational unit 54, various commercially available apparatus can be utilized as the dimensional acceptance display 56. For example, in some embodiments of the invention simple "go/no-go" lamps may be sufficient with the no-go lamp being energized if any of the calculated geometrical and dimensional characteristics of the aperture being inspected do not correspond to the desired design objectives. On the other hand, since a great deal of useful information can be made available by the computational unit 54, it is often advantageous to utilize a dimensional acceptance display which supplies information useful in determining whether the inspected aperture can be brought within acceptable limits by subsequent machining operations. For example, in one realization of the hereinafter described embodiment of the invention that is configured for the inspection of apertures for receiving tapered fasteners, the dimensional acceptance display unit is preferably a conventional computer terminal of the type which is activated by a computer to print alphanumeric messages. In this particular arrangement, the computational unit 54 is programmed to supply the computer terminal with information representative of the sampled $\theta$, r and z coordinate information and each calculated geometrical and dimensional characteristic. A hard copy printout of all this information is provided by the computer terminal along with diagnostic messages that are generated by the computational unit 54 to indicate why an inspected aperture is not acceptable.

Figure 2A:
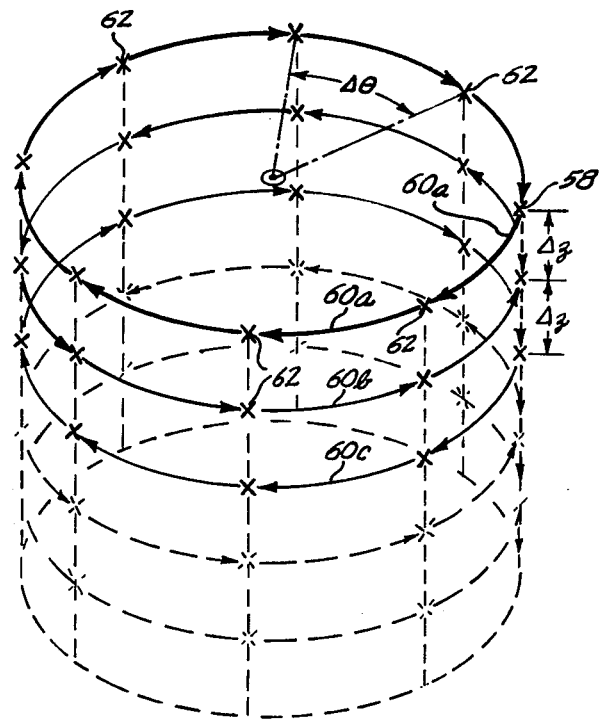
FIGS. 2A and 2B diagrammatically depict the path followed by the probe tip of a profile sensor utilized in this invention during two different aperture scanning sequences.

In view of the above description of the invention, it can be recognized that various scanning sequences can be utilized to provide coordinate information which defines the geometry of the aperture being inspected. For example, in the scanning sequence that is schematically depicted in FIG. 2A, the profile sensor 10 is moved by the probe manipulator 20 so that the probe tip 26 is first indexed to a starting position 58, either along the top or bottom regions of the aperture being inspected, and then rotated through a circular path 60a. Each time the probe tip 26 traverses an arcuate segment having a predetermined angle of inclusion $\Delta\theta$, the angular detector 42 supplies a signal pulse to the strobe terminal 52 which activates the display units 44, 46 and 50 to thereby supply one set of r, $\theta$ and z coordinate information to the computational unit 54. Thus, $2\pi/\Delta\theta$ sets of signal samples (62 in FIG. 2A) are supplied to the computational unit 54 during the circumferential scan 60a. When the probe tip 26 reaches the start position 58, the motor control logic 38 activates the z axis drive motor 28 to move the probe tip 26 vertically by a predetermined incremental amount $\Delta z$. The $\theta$ drive motor 30 is then reactivated to cause the probe tip 26 to follow a second circumferential path 60b, with the angular position detector 42 again supplying a strobe signal each time the probe tip 26 moves through an arc defined by the angle $\Delta\theta$. As is indicated in FIG. 2A, the circumferential scans 60a, 60b, . . . , preferably alternate between a clockwise and a counterclockwise scanning direction. This alternation prevents the electrical cable which interconnects the probe manipulator 20 and the manipulator control/signal processor from becoming twisted or wound about the probe manipulator.

Figure 2B:
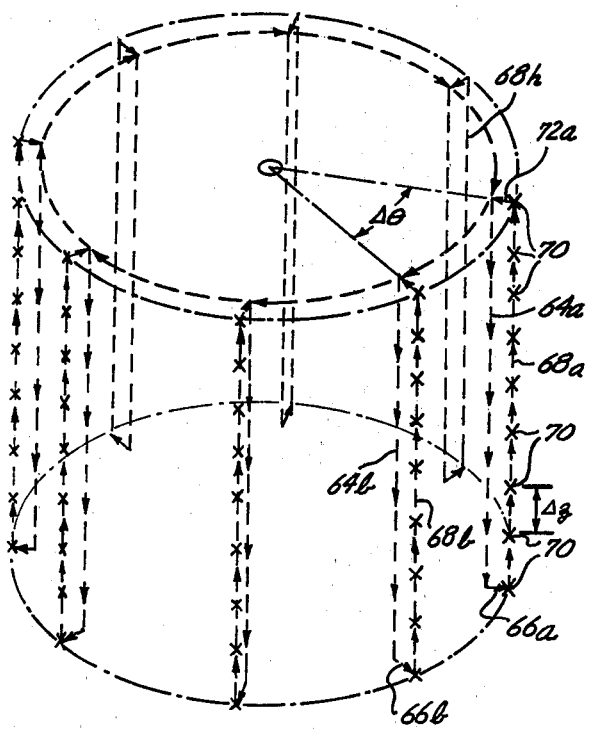

The scanning sequence depicted in FIG. 2B differs from that of FIG. 2A in that the probe tip 26 is alternately moved upwardly in contact with an axial element of the aperture being inspected and then indexed circumferentially through an angle of $\Delta\theta$. In particular, this scanning sequence is preferably effected by first activating the z axis drive motor 28 to move the probe tip 26 to the position of deepest penetration into the aperture being inspected, e.g., the lower boundary of the aperture 16 with the probe tip 26 preferably being positioned so that it does not contact the aperture wall 14 as it moves downwardly to thereby prevent damage to the profile sensor 10 during periods in which signal information is not being stored. For example, and with reference to FIG. 2B, the probe tip 26 is moved downwardly along a vertical path 64a until the probe tip 26 reaches a position at which it is adjacent to the lower boundary of the aperture being inspected. Next the probe tip 26 is moved radially outward along a path 66a to place the probe tip 26 in contact with the aperture wall 14. With the probe tip 26 contacting the aperture wall 14, the z axis drive motor 28 is then activated by the motor control logic 38 so as to move the profile sensor 10 vertically upward. As the probe tip 26 moves upwardly along the path 68a (in contact with the aperture wall 14), the axial position detector 40 periodically supplies a signal pulse to the strobe terminal 52 to thereby load a set of coordinate data r, $\theta$ and z into the display units 44, 46 and 50 and the computational unit 54. In particular, the axial position detector 40 supplies a strobe pulse each time the probe tip 26 moves an incremental amount $\Delta z$ so that coordinate information is provided at a plurality of equally spaced apart sampling points 70. When the probe tip 26 reaches the uppermost terminus of the vertical scan path 68a, the probe tip 26 is moved radially inward along the path 72a such that it no longer contacts the aperture wall 14 and the $\theta$ drive motor 30 is activated by the motor control logic 38 to move the probe tip 26 along a circumferential path 74a having an angle of inclusion $\Delta\theta$. The Z axis drive motor 28 is then activated by the motor control logic 38 to move the probe tip 26 downwardly along the path 64b, radially outward along the path 66b until it contacts the aperture wall 14, then upwardly along the contact path 68b. Continuing in this manner, the probe manipulator 20 moves the probe tip 26 completely around the circumference of the aperture 16 being inspected. Preferably, when the probe tip 26 has been moved upwardly along the final contacting path (68h, in FIG. 2B) the probe tip is moved to a noncontacting position and the $\theta$ drive motor is reversed to swing the probe tip 26 through a circular path and back to the point of beginning.

Comparing the scanning sequence of FIGS. 2A and 2B, it can be noted that both of these sequences will provide an identical collection of coordinate data as long as identical axial increments $\Delta z$ and angular increments $\Delta\theta$ are employed. Accordingly, the scanning sequence utilized in a particular embodiment of the invention is generally selected in view of the geometry of the apertures being inspected and various considerations relating to mechanical and electrical design criteria of the inspection system. For example, in situations wherein the contour of the aperture wall 14 primarily varies relative to the Z direction, the scanning sequence of FIG. 2B is generally advantageous since circumferentially directed forces (side forces) are not exerted on the probe tip 26 and since such a scanning sequence can usually be effected with a less complex electronic arrangement than the scanning sequence of FIG. 2A.

Having described the basic structure and operation of an inspection system constructed in accordance with this invention, a specific example thereof will now be set forth. The particular system described hereinafter corresponds to the arrangement of FIG. 1 and utilizes the scanning sequence of FIG. 2B to inspect precisely machined apertures for receiving tapered fasteners of the type utilized to join structural components of aircraft and other structures that are subject to operational stress and strain. As is known in the art, such tapered fasteners are precisely dimensioned and require apertures of corresponding preciseness so that when the fastener is drawn into the aperture, a controlled amount of interference occurs between the fastener and the walls of the aperture. This interference produces compressive stress which joins the component parts together in a manner which provides high resistance to structural fatigue and thereby extends the service life of the fabricated structure so that the overall economy of the fastener system is superior to that of other conventional fastening techniques.

Figure 3:
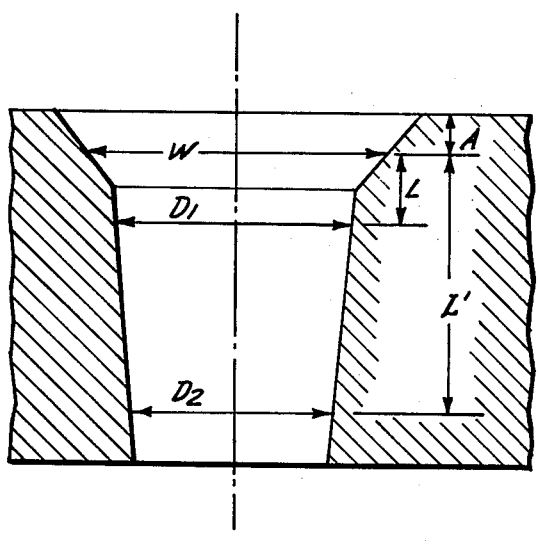
FIG. 3 is a cross-sectional view of an aperture for receiving tapered fasteners of the type that is evaluated by a herein described embodiment of this invention.

The advantages of the tapered fastener system can be attained only if the fastener apertures are machined to exhibit precise dimensional and geometrical characteristics. In this respect, FIG. 3 illustrates the geometry of a typical aperture for receiving a flush head tapered fastener and indicates dimensional and geometrical features which must be controlled to ensure optimal reliability of the fastener system. For example, the inspection procedures that have been adopted within the art call for determining the aperture diameter W at a data plane located a distance A below the surface of the workpiece in which the aperture is located and determining the aperture diameters $D_1$ and $D_2$ in two additional data planes, respectively located a distance L and L' below the data plane in which the W dimension is determined. The A, L and L' distances and the dimensional tolerances that must be met by the W, $D_1$ and $D_2$ dimensions vary in accordance with the size (e.g., nominal diameter) and length or "group number" of the tapered fastener being utilized. Such dimensional quantities being setforth in various industry handbooks and published technical data such as Engineering Report No. 353, published by Omark Industries of El Segundo, California on Feb. 4, 1975. For purposes of understanding the hereinafter described embodiment of the invention, it is sufficient to recognize that each of the above-mentioned dimensions must generally be measured to an accuracy of one-ten-thousandths of an inch and must be within a few ten-thousandths of an inch of a nominal specified value.

Further, under current industry standards, the aperture depicted in FIG. 3 must meet strict roundness requirements wherein roundness is defined in terms of the difference between maximum and minimum length radii of the circular cross-sectional pattern defined in any plane parallel to the data planes depicted in FIG. 3. In this regard, the criteria set forth in the above-mentioned Omark Industries Engineering Report No. 353 specifies a roundness tolerance of 0.0008 inches for apertures having a length to diameter ratio less than 3.5 and a roundness tolerance of 0.0012 inches for apertures having a length to diameter ratio greater than 3.5.

Perpendicularity requirements must also be met. For example, under applicable industry standards, when the aperture is machined in a workpiece having a substantially flat surface, the aperture axial centerline must be within 2 degrees of being perpendicular to the surface of the workpiece.

Further, to ensure proper interference between the fastener and the walls of the aperture, an aperture for currently available tapered fasteners should be tapered 0.25 inches per foot within a tolerance of ±0.0004 inch/inch and each axial element of the interior surface of the aperture should be substantially straight. Although no industry standards have been presently determined with respect to straightness criteria, based an accepted tolerances related to the interference that must exist between the tapered fastener and the aperture to which it is installed, it has been found that deviations of less than approximately 0.0003 times the depth of the aperture (in inches) provides satisfactory results.

FIGS. 4–8 depict a probe manipulator (20 in FIG. 1) that is constructed and arranged for the inspection of apertures that extend downwardly into a production workpiece, such apertures including, but not limited to, the previously described apertures for receiving tapered fasteners. In the depicted arrangement, a conventional ball slide assembly 80 extends vertically upward from a plate 82 that is rotatably mounted to a base unit 84. The central, slidable portion 86 of the ball slide assembly 80 is driven upwardly and downwardly through a rack and pinion assembly 88 by means of a reversible DC motor 90 which serves as the z axis drive motor 28 of the arrangement depicted in FIG. 1. Since the profile sensor 10 is mounted within a mounting block 92 that is affixed to the ball slide central portion 86, the profile sensor 10 can be driven vertically (e.g., over the paths 66 and 68 of the scanning sequence depicted in FIG. 2B), through operation of the z axis motor 90. A rotary encoder 94, geared to the shaft 96 of the rack and pinion assembly 88, supplies an electrical signal as the ball slide 80 is operated to thereby supply a signal representative of the z axis position of the probe tip 26 of profile sensor 10.

To provide the desired angular or circumferential travel of the probe tip 26, a second DC motor 98 (corresponding to $\theta$ drive motor 30 of the arrangement depicted in FIG. 1 and hereinafter referred to as the $\theta$ motor) operates a conventional Geneva stop mechanism 100 that turns the rotatable plate 82 through a desired angle $\Delta\theta$, (i.e., moves the probe tip 26 over the paths 74 of FIG. 2B.

Figure 4:
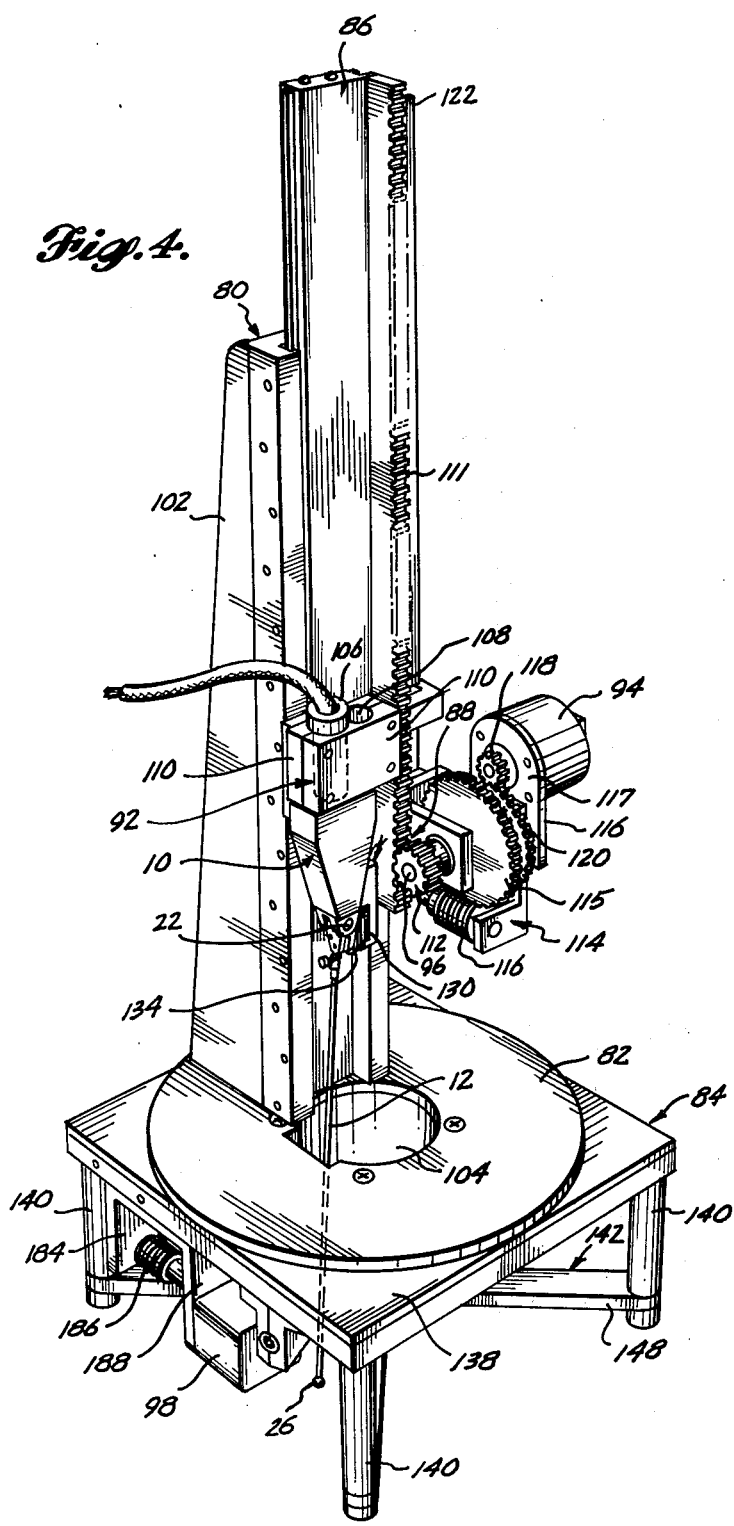
FIG. 4 is an isometric view of a probe manipulator constructed in accordance with this invention.

As can best be seen in FIGS. 4, 5 and 7, the rotatable plate 82 is substantially annular in geometry with the ball slide assembly 80 being rigidly affixed to the transverse face of a substantially U-shaped channel 102 that extends orthogonally upward from a sector of the annular rotatable plate 82. In the depicted embodiment, the central opening 104 of the rotatable plate 82 is generally circular and includes a rectangular cutout along one portion of the periphery to permit the probe 12 to extend downwardly through the plate 82 and base unit 84 without contacting either the rotatable plate 82 or base unit 84. The profile sensor 10 of the depicted arrangement is a conventional component such as the series 21-3310 displacement transducer which is manufactured by the instrument systems division of Gould, Inc. of Cleveland, Ohio.

Figure 6:
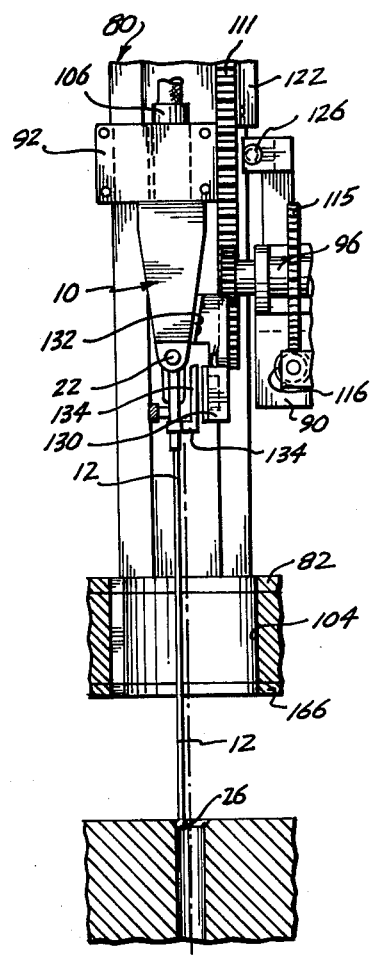
FIG. 6 is an enlarged view of a portion of the front elevation depicted in FIG. 5.

As can be seen in FIGS. 4–6, the profile sensor 10 includes a cylindrical mounting region 106 that is received and contained in either of two openings 108 that are included in the profile sensor mounting block 92. In particular, the depicted mounting block 92 consists of two rectangular plates 110 having semicircular grooves extending along one face thereof. The plates 110 are joined together with the grooves in alignment with one another and one set of the grooves encompassing the cylindrical mounting region 106 of the profile sensor 10 to securely clamp the profile sensor 10 to the slidable portion 86 of the ball slide assembly 80. In utilizing this arrangement, the profile sensor 10 is placed in the opening 108 that is most remotely located from the center of rotation when relatively large diameter apertures are being inspected and is clamped in the opening 108 that is nearest the center of rotation when relatively small diameter apertures are being inspected. For example, in one realization of the invention, the innermost opening 108 is located 0.095 inches from the center of rotation to place the null position of the probe 12 at approximately mid-depth of an aperture for receiving tapered fasteners having a nominal diameter of three-sixteenth's of one inch. In this realization of the invention, the outermost opening 108 is positioned 0.547 inches from the center of rotation to place the null point of the probe at approximately the upper surface of an aperture for receiving one inch diameter tapered fasteners.

It will be recognized by those skilled in the art, that the profile sensor mounting block 92 can be configured in a variety of manners to selectively position the profile sensor 10 relative to the center of rotation of the rotatable plate 82. For example, the mounting block 92 can be constructed and arranged to include a micrometer head for precisely positioning the profile sensor 10 in situations wherein the nominal diameter of the apertures to be inspected varies over a substantial range.

As previously mentioned, the rack 111 of the rack and pinion assembly 88 is mounted along one edge of the slidable central region 86 of the ball slide assembly 80 and is engaged by a pinion gear 112 that is driven by the z axis motor. More specifically, the pinion gear 112 is pressed or otherwise retained on one end of the shaft 96 which passes between parallel spaced apart faces of a z axis mounting bracket 114 which is affixed to the outer region of the ball slide 80 and/or one face of the U-shaped ball slide mounting channel 102. The z axis drive motor 90 is mounted to a portion of the mounting bracket 114 so as to orient the shaft of the z axis motor 90 such that it extends inwardly toward and is substantially perpendicular to the shaft 96. A worm gear 115, pressed or otherwise retained on that portion of the shaft 96 that is located between the spaced apart parallel flanges of the mounting bracket 114 meshes with a worm 116 that extends forwardly from the shaft of the motor 90 with the other end of the worm 116 being rotatable received in a small tabular region of the mounting bracket 114. Further, a rotary encoder 94, which corresponds to the z axis encoder 32 of FIG. 1, is mounted to an upwardly extending tabular region 117 that is mounted to or integrally formed with the mounting bracket 114 such that the shaft of the rotary encoder 94 is positioned above and substantially in line with the pinion shaft 96. As can be seen most clearly in FIG. 5, the shaft of the rotary encoder 94 includes a spur gear 118 which is engaged with a low backlash spur gear 120 that is pressed or otherwise contained on the pinion shaft 96.

As previously mentioned, the rotary encoder 94 is a conventional device which supplies an electrical pulse signal each time the shaft of the rotary encoder is rotated through a predetermined angle. One example of such a device, which has been satisfactorily utilized in one realization of the depicted probe manipulator, is the model 8602-69 rotary incremental encoder which is available from Teledyne Gurley of Troy, New York. This particular rotary encoder is an optical device that generates two phototransistor output signals that are in phase quadrature to thereby permit a determination of the direction of rotation (and hence the direction of z axis travel in the depicted probe manipultor). Viewing the manner in which the rotary encoder 94 is coupled to the rack 111, it can be recognized that such a rotary encoder supplies KLM pulses for each inch of z axis travel, where K represents the gear ratio between the rack 111 and pinion gear 112 (revolutions/inch), L denotes the gear reduction of the spur gears 118 and 120, and M represents the number of pulses per revolution that is supplied by the rotary encoder 94. Additionally, and as shall be described hereinafter, the resolution of this arrangement can be increased by electronically multiplying the pulse frequency supplied by the rotary encoder 94. For example, in one realization of the depicted probe manipulator, the pinion gear rotates one-half a revolution each time the profile sensor 10 is moved one inch in the vertical direction, the spur gears 116 and 118 provide a reduction factor of 1:4, the rotary encoder 94 supplies 1250 signal pulses per revolution and electronic frequency multiplication by a factor of 4 is utilized to provide an arrangement which supplies one signal pulse each time the profile sensor 10 moves 0.0001 inches To provide an appropriate z axis reference, which permits the inspection system of this invention to determine the exact z coordinate of the probe tip 26 from the signals supplied by the rotary encoder 94, the depicted probe manipulator includes an optical indexing mechanism which supplies an electrical signal each time the probe manipulator moves the probe tip 26 through a predetermined Z coordinate. In the depicted probe manipulator, this optical indexing arrangement includes a small opaque flange 122 that is mounted along a portion of the rack 111 to extend outwardly from the slidable portion 86 of the ball slide assembly 80. As the z axis motor 90 is operated to move the profile sensor 10 downwardly, the lower terminus of the flange 122 passes between a light source 124, such as a light emitting diode, and a conventional optical detector 126 which are mounted in spaced apart juxtaposition with one another in a bracket 128 that extends upwardly from the z axis mounting bracket 114. As the flange 122 interrupts the light energy which otherwise passes between the optical source 124 and photodetector 126, the photodetector 126 supplies an electrical signal which indicates that a probe tip 26 is passing through a specific z coordinate. For example, in the previously mentioned realization of the depicted proble manipulator, the flange 122 is mounted at a position which causes the photodetector 126 to supply a signal pulse when the probe tip 26 passes through a z coordinate located 0.0154 inches below the surface of the workpiece which includes the aperture being inspected.

In the depicted probe manipulator, the probe 12 is moved to and stowed in a vertically extending noncontacting position during portions of the scanning sequence in which the probe tip 26 does not contact the walls of the aperture being inspected by an electromagnet 130 which is mounted on a bracket 132 that extends downwardly from the profile sensor 10. In particular, the electromagnet 130 is oriented such that is supplies a magnetic field substantially perpendicular to the probe 12. For example, the electromagnet 130 can be a conventional C-shaped ferrite core having a number of turns of insulated wire wound about the central portion of the core. A small L-shaped protrusion 134, constructed of a material having a relatively high permeability, is attached to the upper portion of the probe 26 with one face thereof being in spaced apart juxtaposition with the electromagnet 130. When the electromagnet 130 is energized, the upwardly extending portion of the L-shaped protrusion 134 is drawn to the face of the electromagnet thereby swinging the probe 12 about the probe pivot point 22 to place the probe 12 in a noncontacting vertically extending position. As shall be described relative to the motor control logic circuitry illustrated in FIG. 14, the probe 12 is automatically moved to the stowed position during noncontacting portions of the probe scanning sequence (e.g., during movement along the paths 64 and 74 of FIG. 2B).

The base unit 84 of the probe manipulator depicted in FIGS. 4-8 includes a rigid platform formed by a substantially rectangular plate 138 and legs 140 that extend orthogonally downward from the four corners of the plate 138. The lower regions of the legs 140 are interconnected by a centering and calibration fixture 142 that includes a downwardly extending circular flange 144 which forms an opening 146 that permits passage of the probe 12. Four cross members 148 extend diagonally outward from the flange 144 to interconnect the flange 144 with the legs 140 and position the center of the circular opening 146 at the axis of rotation of the profile sensor 10. The centering and calibration fixture 142 is utilized with the various inserts depicted in FIGS. 11–13 for positioning the probe manipulator above the aperture to be inspected and during calibration or verification procedures for verifying that the inspection system is operating properly.

The central region of the base unit top plate 138 includes a circular opening 150 that is formed by a downwardly extending annular flange 152. An annular cover plate 154 is affixed to the lower surface of the flange 152 to form a circular recess for housing a matched pair of preloaded annular contact bearings 156 and 158. In particular, the bearings 156 and 158 are placed in the opening formed by the flange 152 and cover plate 154 with a bearing pressure ring 160 being positioning on top of the uppermost bearing 156 and being interposed between the lowermost bearing 158 and the lower cover plate 154. A substantially rectangular upper cover plate 162, having a central, circular opening of a diameter slight greater than the opening 150 is affixed to the upper surface of the base unit top plate 138 to securely maintain the contact bearings 156 and 158 in the base unit 84. An annular bearing ring 164, having a central opening corresponding to the geometry of the opening 104 in the rotatable plate 82, is mounted to the lower surface of the rotatable plate 82 and extends downwardly through the annular contact bearings 156 and 158.

The slotted wheel portion 166 of an eight position Geneva stop mechanism 100 is affixed to the lower surface of the bearing ring 164. As can best be seen in FIG. 8, the slotted wheel 166 of the Geneva stop 100 includes a central opening 168 that corresponds in geometry to the central opening 104 of the rotatable plate 82 and the opening 150 through the flange 152. The drive disc 170 of the Geneva stop mechanism 100 is mounted to the lower surface of the base unit top plate 138 by means of a mounting bracket 172 (FIG. 5). As is known by those skilled in the art, the drive disc 170 includes an outwardly extending crank pin 174 that engages radially extending slots 176 in the slotted wheel 166 as the drive disc 170 is rotated to thereby rotate the slotted wheel 166 through a distance equal to the angle defined between adjacent slots 176. As the crank pin 174 leaves a slot 176, an arcuately contoured portion of the drive disc 170 rotates into one of the arcuate notches 178 that are interspersed between the slots 176 to maintain the slotted wheel 166 in a stationary position until the crank pin 174 engages the next slot 176. Thus, the Geneva stop mechanism 100 provides an intermittent "move and hold" action which rotates the rotatable plate 82 through the circumferential paths 74 of FIG. 2B (through the angular increment $\Delta\theta$).

As previously described relative to the circuit arrangement of the invention depicted in FIG. 1, a $\theta$ encoder 34 supplies a signal which permits the system to determine the angular ($\theta$) position of the probe 12. In this respect, the probe manipulator depicted in FIGS. 4–8 includes a microswitch 180 that is mounted to the lower surface of the base unit top plate 138 such that the crank pin 174 of the Geneva stop mechanism 100 activates the microswitch 180 each time the slotted wheel is rotated, i.e., each time the crank pin 174 leaves one of the slots 176 of the slotted wheel 166. Thus, the microswitch 180 supplies a signal pulse or conductive path which deactivates the motordrive 98 and updates the counter 34 each time the rotatable plate 82 and probe tip 26 moves through the angle $\Delta\theta$ of the probe scanning sequence.

In the depicted arrangement, the drive disc 170 of the Geneva stop mechanism 100 is driven by means of a worm gear 182 that is pressed or otherwise retained on the central shaft 184 of the Geneva stop mechanism drive disc 170. A worm drive 186, rotatably mounted between spaced apart and downwardly extending walls of a U-shaped mounting bracket 188, which is affixed to the lower surface of the base unit top plate 138, engages the worm gear 182 of the Geneva stop mechanism 100. The $\theta$ drive motor 98 is mounted to one of the downwardly extending legs of the U-shaped mounting bracket 188 with the motor shaft passing through a suitably sized opening and being coupled to the worm drive 186. As shall be described relative to the motor control logic circuit depicted in FIG. 14, the $\theta$ drive motor is a reversible DC motor which is intermittently energized to rotate the rotatably plate 82 and profile sensor 10 through the scanning angle $\Delta\theta$. In particular, each time the rotatable plate 82 and profile sensor 12 are rotated through an angle of $\Delta\theta$, i.e., one of the paths 74 of the scanning sequence depicted in FIG. 2B, operation of the $\theta$ motor 98 is interrupted until the probe tip 26 has been moved through an axial segment of the aperture scanning sequence, i.e., traversal of a path 64, and a path 68 of the scanning sequence depicted in FIG. 2B.

FIGS. 9 and 10 illustrate an alternative arrangement for the base unit 84 that can advantageously be employed when the apertures being inspected are not located in a workpiece having a flat surface. In this arrangement, the base unit top plate 138 includes three downwardly extending legs 190 of equal length and three legs 192 that include displacement sensors. As can be seen best in FIG. 10, the solid legs 190 and the displacement sensing legs 192 are preferably positioned at the vertices of intersecting equilateral triangles (191 and 193) such that the legs 190 and 192 form a pattern corresponding to a regular hexagon. As is indicated in FIG. 9, each displacement sensing leg 192 includes a displacement sensor 194 such as a linear variable differential transformer that is slidably received and contained within the lower portion of the legs 192. With the displacement sensors 194 being spring-loaded or otherwise biased in a position wherein the overall length of the legs 192 is greater than that of the legs 190.

With continued reference to FIG. 9, when a probe manipulator utilizing this arrangement of the base unit platform 136 is positioned over an aperture 196 in a workpiece 198 which has an irregular or slightly curved surface 200, the probe manipulator is rocked or moved about the vertical axis 202 until the signals supplied by the displacement sensors 194 of the three legs 192 are substantially equal in magnitude. When the signals supplied by the displacement sensors 194 are equal, it can be realized that the lower terminus (i.e., the tip of each displacement sensor 194) lies in a plane parallel to a plane which includes the lower terminus of each solid leg 190. This being the case, it can be recognized that the vertical axis 202 is thus positioned orthogonally to the mean plane 200 which includes the aperture 196. Accordingly, with respect to apertures 196 that extend vertically downward into the workpiece 198, the center of rotation of the profile sensor 10 is positioned coincident with the axial centerline of the aperture to be inspected. On the other hand, in situations wherein the aperture to be inspected does not extend vertically downward into the workpiece 198, the arrangement of FIGS. 9 and 10 provides a reference coordinate system which remains constant as the inspection system is utilized to measure apertures in different workpieces 198 of identical surface contour 200, similar apertures within the same workpiece 198 or utilized to reinspect the same aperture 196.

Regardless of the configuration of the base unit platform 136, the procedure for inspecting an aperture begins by centering the probe manipulator over the aperture to be inspected. To permit proper positioning of the probe manipulator depicted in FIGS. 4–8, centering inserts or plugs 204, such as those depicted in FIGS. 11 and 12 are installed in the central opening 146 of the centering and calibration fixture 142. More specifically, the profile sensor 10 is driven upwardly by means of the z axis drive motor 90 to a position in which the probe tip 26 is above the upper surface of the centering and calibration fixture 142. The probe manipulator is then positioned such that the central opening 146 of the centering and calibration fixture 142 is directly above the opening of the aperture to be inspected. An appropriate centering plug 204 having an intermediate circular region of a diameter equal to the diameter of the opening 146 and an outwardly extending shoulder 208 at one end of the centering plug 204 is inserted through the centering and calibration fixture opening 146 so that the lower portion of the centering plug 204 extends into the upper portion of the aperture being inspected. For example, FIG. 11 illustrates the depicted probe manipulator being positioned over an aperture wherein the diameter of the upper region of the aperture is substantially equal to the diameter of the centering and calibration fixture opening 146. In this case, the centering plug 204 has a substantially constant diameter throughout the lower region thereof which contacts both the walls of the flange 144 that forms the centering and calibration fixture opening 146 and the wall of the aperture 210 that is to be inspected.

As is illustrated in FIG. 12, in situations wherein apertures 212 which include upper regions of known but different diameters, the centering plug 204 can include a series of shoulders 214, each having a diameter substantially equal to the diameter of one of the apertures to be inspected. In this arrangement of the centering plug 204, the diameter of each shoulder 214 decreases with respect to the distance between that particular shoulder 214 and the central region 206 of the centering plug that contacts the centering and calibration fixture opening 146. Thus, when the probe manipulator is positioned above an aperture 212 that is to be inspected, the centering plug 204 is inserted in the opening 146 and the probe manipulator is maneuvered until the shoulder 214 which has a diameter corresponding to that of the aperture 212 contacts the aperture wall to thereby center the probe manipulator. The shoulders 214 can be tapered if the apertures being inspected are tapered and the centering plugs 204 can be otherwise contoured to correspond to the surface profile of any particular aperture to be inspected.

In addition to providing for the centering of the probe manipulator over the aperture that is to be inspected, the centering and calibration fixture 142 can be utilized to perform periodic verification or calibration procedures that ensure the aperture inspection system is operating properly. For example, as is illustrated in FIG. 13, a calibration ring 216 that includes a barrel region 218 having a diameter substantially equal to the diameter of the opening 146 of the centering and calibration fixture 142 and a larger diameter shoulder 220 can be inserted in the opening 146 of the centering and calibration fixture 142. With the calibration ring 216 so installed to the centering and calibration fixture 142, the z axis drive motor 90 is operated to position the probe tip 26 within a particular annular recess of a series of recesses or counterbores 222 that are centrally located within the calibration ring 216. The $\theta$ drive motor 30 is then actuated to turn the rotatable plate 82 and thereby move the probe tip 26 circumferentially around one of the recesses 222. Since the recesses 222 are precisely machined to a known geometry (e.g., are of constant diameter), the inspection system should, if operating properly, supply radial deflection values of known magnitude at each of the data sampling points (i.e., at each position $\Delta\theta$). In this respect, the radial deflection can be visually observed on the r display unit 50 of the manipulator control/signal processor 36 to ascertain that the profile sensor 10 is supplying the proper signals, and/or the computational unit 54 can be programmed or wired to facilitate calibration or verification by comparing the signals supplied by the profile sensor 10 with signals appropriate to the geometry of the recess 222 being utilized. Additionally, it can be recognized that the calibration ring 216 can be constructed and arranged to verify or test operation of the z axis portion of the inspection system. For example, a calibration ring can be constructed to include an aperture having a known or predetermined axial contour, the probe tip 26 can be positioned at the bottom of the recess and then moved vertically upward. By comparing the radial signals produced by the profile sensor 10 as it moves in the z direction with values that correspond to the known contour of the calibration ring 216, proper operation of the system in both the radial and z directions can be ascertained.

When the probe manipulator has been properly positioned over the aperture to be inspected, the manipulator control/signal processor 36 (FIG. 1) is activated to cause the inspection system to automatically execute the scanning sequence and provide coordinate data information to the computational unit 54. As previously mentioned, the computational unit 54 performs appropriate calculations and compares the computed values with values corresponding to the desired contour of the aperture being inspected and activates the dimensional acceptance display 56 to indicate whether the aperture being inspected meets predetermined manufacturing tolerances. In particular, when the inspection system is configured for evaluating the geometrical and dimensional characteristics of apertures for receiving tapered fasteners, the computational unit determines the diameter and roundness characteristics at various locations along the aperture length, determines the straightness and taper characteristics of various axial wall elements along the circumference of the aperture, and determines the perpendicularity of the aperture relative to the surface of the workpiece.

One embodiment of a manipulator control/signal processor (36 in FIG. 1) which has been utilized with the above-described probe manipulator to effect the scanning sequence depicted in FIG. 2B wherein $\Delta\theta$ is equal to 45 degrees and $\Delta z$ can be selected to be between 0.010 and 0.990 inches in increments of 0.010 inches, is depicted in FIG. 14. As shall be described in the following paragraphs, the circuit arrangement of FIG. 14 is advantageous in that it permits the operator to select either an automatic or manual scanning mode and allows the inspection system to be programmed to inspect various depth apertures.

With particular reference to the circuit diagram of FIG. 14, the circuitry for detecting the radial deflection of the profile sensor probe 12 (radial deflection detector 48 of FIG. 1) includes cascade connected probe signal conditioner 226, analog-to-digital (A/D) converter 228, and digital adder circuits 230 and 232. In this arrangement, the probe signal conditioner 226 receives the deflection signals supplied by the profile sensor 10 and also provides any excitation signal that is required by the profile sensor 10. For example, with respect to the previously described series 21-3310 profile sensor that is manufactured by Gould, Inc., the probe signal conditioner 226 includes an oscillator circuit that provides an excitation signal at 25 KHz to the linear variable differential transformer located within the profile sensor 10 and includes a synchronous detector which demodulates the signals supplied by the profile sensor 10 to thereby provide an analog signal that varies in amplitude as the probe 12 is deflected. In this embodiment, the probe signal conditioner 226 also includes differential amplifiers for amplifying the analog signal supplied by the demodulator circuit with such amplifiers including a variable offset control to permit the circuit to be adjusted so that the output signal varies linearly from a level of 0 volts as the probe tip 12 is deflected from its quiescent position. Such a signal conditioner is available from Gould Industries.

The A/D converter 228 is preferably a conventional integrated or modular circuit arrangement such as the ADC-12QZ general purpose analog-to-digital converter that is manufactured by Analog Devices of Norwood, Massachusetts. As is known in the art, such a device supplies a parallel format digitally encoded signal representative of the applied analog signal each time a strobe or "convert command" signal is applied to the A/D converter. Additionally, such a device supplies a "status" signal to indicate that the analog-to-digital conversion is complete and the digitally encoded output signal is available. As is indicated in FIG. 14, this status signal is supplied to an interrupt terminal 234 that is interconnected with the computational unit 54 of FIG. 1 to thereby signal the computational unit 54 that a new set of coordinate data is available. As is further indicated in FIG. 14, the strobe signal is supplied via a mode selector switch 236. More specifically, the mode selector switch 236 is interconnected to supply the A/D converter 228 with a strobe pulse each time the probe tip 26 moves upwardly along one of the axial contacting paths of the scanning sequence depicted in FIG. 2B by an amount equal to $\Delta z$ if the mode selector 236 is positioned in the "sample" (S) mode. On the other hand, when the mode selector 236 is placed in the "continuous" (C) position, the strobe pulses are supplied to the A/D converter 228 by a conventional oscillator or clock circuit 238. For example, in one realization of the embodiment of the invention depicted in FIG. 14, the oscillator 238 supplies a 5 Hz clock signal and the z axis drive motor 90 moves the probe tip 26 at one inch per second. Thus, when this realization of the invention is operated with the mode selector 236 in the C position, the oscillator 238 supplies a strobe signal to the A/D converter 228 each time the probe tip 26 moves through a distance $\Delta z$ of 0.02 inches.

Regardless of whether the A/d converter 228 is supplied strobe pulses from the oscillator 238 or the axial position detector 40, the adder circuit 230 combines the signals supplied by the A/D converter 228 with a parallel format digital signal supplied by a radial offset control 240 and supplies a digital signal equal to the sum of these two input signals to the adder 232. Radial offset control 240 is a series of selector switches or another conventional device that can be manually operated by the operator of the inspection system to supply a parallel format digital signal representative of the distance between the quiescent position of the probe tip 26 and the center of rotation of the profile sensor 10. For example, with respect to the previously mentioned embodiment of the probe manipulator depicted in FIGS. 4–8 in which the centers mounting block openings 108 are positioned 0.095 inches and 0.547 inches away from the center of rotation, the radial offset control 240 is set to establish a digital signal representative of 0.1006 inches when the profile sensor 10 is mounted in the innermost mounting block opening 108 and is set to establish a digital signal representative of 0.5495 inches when the profile sensor 10 is mounted in the outermost opening 108. Since the A/D converter 228 supplies a digital signal representative of the deflection of the probe 12 and the radial offset control 240 supplies a digital signal representative of the distance between the probe manipulator center of rotation and the quiescent position of the probe 12, the signal supplied by the adder 230 supplies a parallel format digital signal representing the radius of the aperture being inspected at each particular point of the probe scanning sequence in which a strobe pulse is applied to the A/D converter 228. Adder 232 combines the digital signal supplied by adder 230 with a digital signal representative of the "two's complement" of one-half the full scale output of A/D converter 228, which is supplied by a radial preset control 242, to thereby center the dynamic range of the A/D converter 228 about the value of radial offset that has been selected with radial offset control 240. As was described relative to the basic system arrangement of FIG. 1, the digital signal representative of the radius of the aperture being inspected is supplied to the r display unit 50, which in turn, supplies the digital signal to the computational unit 54.

In the arrangement of FIG. 14, the circuitry for supplying a signal representative of the axial (z) position of the probe tip 26 (axial position detector 40 of FIG. 1) includes a z axis signal conditioner 244, a conventional divide-by-n circuit 246 and a conventional up/down (U/D) counter 248. In this arrangement, the signal supplied by the z axis encoder 94 is coupled to the z axis signal conditioner 244 which includes a conventional circuit arrangement for detecting whether the z axis drive motor 90 is moving the profile sensor 10 upwardly or downwardly and for supplying a series of pulses to increment or decrement the U/D counter 248 depending on this direction of movement. For example, when the previously mentioned Teledyne Gurley Model 8602-69 rotary incremental encoder is utilized, the z axis signal conditioner is a Model SC602 series external signal conditioner, which is also commercially available from Teledyne Gurley. This signal conditioner effectively decodes the previously mentioned quadrature signals supplied by the Model 8602-69 rotary incremental encoder to determine the direction in which the shaft of the encoder is being turned and supplies signal pulses to first and second output terminals which respectively indicate the amount of clockwise and counterclockwise rotation. Thus, recalling that the z axis encoder 94 is linked to the slidable portion 86 of the ball slide assembly 80 by means of the rack and pinion assembly 88, it can be recognized that the U/D counter 248 receives count up and count down pulses that respectively indicate the upward and downward movement of the profile sensor probe tip 26. For example, in the previously mentioned realization of the invention wherein the z axis encoder 32 supplies 1250 signal pulses each time the encoder shaft is rotated through one revolution and the combined gear ratio effected by the rack and pinion assembly 88 and spur gears 118 and 120 is 1:4, the z axis signal conditioner 244 includes conventional circuitry for multiplying the frequency of the signals supplied by the z axis encoder 32 by a factor of 4. Accordingly, in this realization, the U/D counter 248 receives a count up or count down pulse each time the probe tip 26 is moved upwardly or downwardly by 0.0001 inches.

To ensure that the U/D counter 248 supplies a parallel format digital signal representative of the actual z position of the probe tip 26, the U/D counter 248 is preset to a predetermined value each time the probe tip 26 passes through a predetermined z position. More specifically, in the depicted arrangement, the U/D counter 248 is preset to the value of a digital signal supplies by a z preset circuit 250 each time an OR gate 252 supplies a signal to the U/D counter 248. As is schematically indicated in FIG. 14, one input terminal of the OR gate 252 is connected for receiving a signal from the previously mentioned optical index switch (e.g., photodetector 126 in FIG. 7) and the second input terminal of the OR gate 252 is connected to a manually operable reset switch 254 that is located on the control panel of the inspection system. Thus, it can be recognized that during the automatic scanning sequence depicted in FIG. 2B, the U/D counter 248 is preset or indexed to a reference count that corresponds to a particular z position each time the probe tip 26 is moved downwardly so that the optical index switch is activated. Preferably, and as previously mentioned, the optical index switch is arranged so that the U/D counter 248 is preset as the probe tip 26 passes into the aperture being inspected, i.e., with the probe tip 26 located relatively close to the surface of the workpiece.

Like the radial offset control 240 and the radial preset control 242, the z preset control 250 can be any conventional device that can be set to supply a desired parallel format digital signal. For example, the z preset control 250 can be a series of manually operable switches that allow the preset value to be established during initial manufacture and calibration of the inspection system or, in situations in which it is not necessary or desirable to control or alter the preset value, the z preset control 250 can be a conventional hard-wired circuit or storage register that supplies the desired digital signal. In any case, it can be recognized that the U/D counter supplies a parallel format digital signal to the z display unit 44 that indicates the exact z coordinate of the probe tip 26. As described relative to the basic embodiment of the invention depicted in FIG. 1, the z display unit, in turn, supplies this coordinate information to the computational unit 54.

The divide-by-n circuit 246 of FIG. 14 is a conventional circuit such as a programmable counter that supplies a single output pulse for each group of n input pulses. In the depicted arrangement, the value of the divisor n is determined by a z increment selector 256 which can be a series of conventional switches or other circuit arrangement that allows the system operator to establish a desired sampling interval $\Delta z$. Since the divide-by-n circuit 246 is interconnected for receiving a pulse signal as the probe tip 26 is moved upwardly in contact with the wall of the aperture being inspected (i.e., moved along the paths 68 of the scanning sequence depicted in FIG. 2B) and supplies a signal pulse each time the probe tip 26 is moved a predetermined distance (e.g., 0.0001 inches), the sampling interval $\Delta z$ is established at nk where k is equal to the resolution of the signal supplied by the z axis signal conditioner 244 (i.e., the distance which the probe tip 26 traverses during the generation of a single signal pulse). For example, in the realization of the invention wherein the z axis signal conditioner 244 supplies a signal pulse each time the probe tip 26 is moved 0.0001 inches, two conventional decade switches which permit the selection of a divisor n ranging between 100 and 9,900 in incremental steps of 100 are utilized to thereby permit the selection of a sampling interval $\Delta z$ ranging between 0.010 and 0.990 inches in steps of 0.010 inch. Since, when the mode selector 236 is set in the sample (S) position, the output terminal of the divide-by-n circuit 246 is interconnected to the sample strobe terminal 52 and hence to the strobe terminals of the z, $\theta$, and r display unit (44, 46 and 50) and is also interconnected with the strobe or command terminal of the A/D converter 228, a new set of coordinate data is displayed and made available to the computational unit 54 at each of the sampling points 70 of the scanning sequence depicted in FIG. 2B. On the other hand, when the mode selector 236 is placed in the continuous (C) position, the strobe terminals of the display units 44, 46 and 50 are connected to a fixed electrical potential to thereby cause continuous display of the supplied coordinate data and the strobe terminal of the A/D converter 228 is connected to the output terminal of the oscillator 238 to supply a set of coordinate data to the computational unit 54 at axial (z) positions that are determined by the pulse frequency of the signal supplied by the oscillator 238.

As previously described, the embodiment of the probe manipulator depicted in FIGS. 4-8 includes a microswitch 180 that is operated each time the Geneva stop mechanism 100 rotates the profile sensor 10 through an angle of $\Delta\theta$ equal to 45 degrees. In the arrangement of FIG. 14, the microswitch 180 is connected to the input of a conventional counter circuit 258 which provides a parallel format digital signal representative of the angular position of the probe 12 to the $\theta$ display 46 and hence to the computational unit 54. More specifically, the counter circuit 258 is preset to contain a value of one at the start of each scanning sequence and sequentially provides output signals corresponding to the digits 2, 3, 4, ..., 8 as the probe tip 26 traverses each of the eight sampling paths 68 of FIG. 2B. Additionally, and as shall be described in the following paragraphs, the digital signals supplied by the counter circuit 258 is utilized to activate the $\theta$ drive motor 98 for returning the profile sensor 10 to its initial angular position once coordinate data has been gathered along all eight of the axial scanning paths.

The remaining circuit elements of the arrangement depicted in FIG. 14 represent one realization of the motor control logic 38 described relative to the arrangement of the invention depicted in FIG. 1. The structural arrangement and operation of this portion of the circuit of FIG. 14 can be most easily understood by considering the operation of such an embodiment of the invention during the inspection or evaluation of an aperture. In this respect, the probe manipulator depicted in FIGS. 4-8 is first positioned over the aperture to be inspected as previously described herein and the radial offset control 240 and z increment selector 256 are respectively set to correspond to the location of the profile sensor 10 within the profile sensor mounting block 92 and the desired sampling interval $\Delta z$. Additionally, the maximum downward travel of the probe tip 26 is established by setting a z max selector 260. Generally, the z max selector 260 is set to correspond to the depth of the aperture being inspected and any of the previously mentioned conventional circuit arrangements which supply a parallel format digital signal representative of a selected numeral can be utilized as the z selector 260. For example, in the previously mentioned realization of the invention, five digital thumbwheel switches that are mounted on the control panel of the inspection system permit a maximum probe tip travel of 9.9999 inches with the maximum z value being selectable in increments of 0.0001 inch.

With the probe manipulator properly positioned above the aperture to be inspected and the desired values of $\Delta z$ and maximum z travel established by means of the selectors 256 and 260, a scan switch 264 is momentarily activated to initiate the automatic inspection of the aperture. As is illustrated in FIG. 14, the scan switch 264 is connected to one input terminal of an OR gate 266 having its output terminal connected to the "load" terminal of the $\theta$ counter 258; is directly connected to the set (S) terminal of a "run" flip-flop circuit 268; and is commonly connected to one input terminal of OR gates 270 and 272 which have their output terminals respectively connected to the reset (R) terminals of a "$\theta/z$" flip-flop 274 and a "U/D" flip-flop circuit 276. Since the scan switch 264 is interconnected to supply an appropriate logic signal (symbolized as ground potential in FIG. 14) when the scan switch 264 is depressed and since the flip-flops 268, 274 and 276 are conventional set-reset flip-flop circuits, depressing the scan switch 264 sets the run flip-flop 268 so that a logic true signal (e.g., a logical one) appears at the flip-flop Q output and resets the flip-flops 274 and 276 so that a logical one signal appears at the Q output terminals of these circuits. Additionally, activation of the OR gate 266 by the scan switch 264 causes the $\theta$ counter to be preset to hold a value corresponding to the numeral one (i.e., the digital signal 0001). In the depicted arrangement, a digital signal representative of the numeral one is stored in a preset control circuit 278 which is a conventional circuit arrangement such as a storage register or arrangement of hard-wired electrical components that supplies a digital signal representative of the numeral one.

It can be noted in FIG. 14 that the Q output of the run flip-flop 268 is connected to one input terminal of AND gates 280, 282, 284 and 286. Since each of these AND gates will supply a logical one signal only when all of the input terminals are supplied a logical one signal, it can be recognized that the Q signal of the run flip-flop 268 effectively serves as an enabling signal which permits appropriate ones of the flip-flops 280, 282, 284 and 286 to be activated by the $\eta/z$ flip-flop 274, the U/D flip-flop 276 and other logic elements of the depicted arrangement. In this regard, the Q and $\overline{Q}$ output signals of the U/D flip-flop 276 are respectively coupled to input terminals of the AND gates 282 and 280 to supply "up" and "down" command signals and the Q and $\overline{Q}$ signals of the $\theta/z$ flip-flop 274 are respectively coupled to the AND gates 284 and 282 to supply signals indicating whether the $\theta$ drive motor 30 or z axis drive motor 28 is to be activated. Since activation of the scan switch 264 causes the $\overline{Q}$ signals of both the $\theta/z$ flip-flop 274 and the U/D flip-flop 276 to be equal to a logical one, it can thus be noted that the AND gate 280 supplies a logical one signal, indicating that the probe will be driven downwardly during the first portion of the scanning sequence, and each of the AND gates 282, 284 and 286 supply a logical zero signal.

In this respect, the output terminal of the AND gate 280 is connected to one input terminal of a differential amplifier circuit 290 via contacts 262a of an auto-manual switch 262 and the output terminal of the AND gate 282 is connected to to one input terminal of an AND gate 292 having its output terminal connected to the second input terminal of the amplifier 290 via the switch contact 262b. Since AND gate 280 supplies a logic of one signal and AND gate 282 supplies a logical zero signal, the amplifier 290 supplies a DC signal to the z axis motor 28 that causes the z axis drive motor to move the profile sensor 10 downwardly into the aperture being inspected. Additionally, the logical zero supplied by the AND gate 282 is inverted in a conventional inverting amplifier 288 to supply a DC signal to the electromagnetic 130 which causes the probe 12 to remain in the noncontacting or stowed position during this portion of the sequence.

As the probe tip 26 moves downwardly along the initial noncontacting path of the scanning sequence (path 64a in FIG. 2B), the photodetector 126 presets the U/D counter 248 in the previously described manner and the z axis signal conditioner 244 supplies signal pulses which cause the U/D counter 248 to be incremented. In the arrangement of FIG. 14, the digial signal representative of the z position of the probe tip 26 is coupled to a z max comparator circuit 294 which also receives the maximum z signal supplied by the z max selector 260. The z max comparator 294 is a conventional digital comparator circuit which supplies an output signal when the signals supplied by the U/D counter 248 is identical to the digital signals supplied by the z max selector. Thus, when the probe tip 26 reaches the maximum z position (e.g., the bottom of the aperture being inspected), the z max comparator 294 supplies a signal to the set terminal of the U/D flip-flop 276 thereby causing the Q output to become a logical one and the $\overline{Q}$ output to become a logical zero. Thus, the output signals supplied by the AND gate 280 switches from a logical one to a logical zero which causes the amplifier 290 to cease driving the z axis motor 90 and thereby causes the probe tip 26 to stop at the maximum z position. Further, since the $\overline{Q}$ output of the $\theta/z$ flip-flop 274 remains a logical one at this time, the Q output of the U/D flip-flop 276 causes the AND gate 282 to supply a logical one signal to one input terminal of the AND gate 292, one input terminal of a conventional time delay circuit 294 and to the inverting amplifier 288. Thus, the electromagnet 130 is deenergized and the probe 26 is permitted to swing into contact with the wall of the aperture being inspected.

The time delay network 294 supplies a logical one signal to the second input terminal of the AND gate 292 after a predetermined time delay which permits the probe tip 26 to come into contact with the aperture wall. When the time delay network 294 supplies the logical one signal, the output of AND gate 292 goes from the logical zero state to the logical one state to thereby supply a signal to the input terminals of the amplifier 290 of a polarity which causes the z axis motor 28 to be driven in the direction which moves the profile sensor 10 in the upward direction.

As the probe tip 26 is moved upwardly in contact with the aperture wall (i.e., along the first scanning path 68a of FIG. 2B), the z axis signal conditioner 244 supplies the previously described pulse signals to the count down terminal of the U/D counter 248 and to the input terminal of the drive-by-n circuit 246. Thus, the U/D cunter 248 is decremented from the maximum z count as the probe tip 26 moves upwardly and each time the probe tip 26 moves through the sampling distance $\Delta$ z established by the z increment selector 256, the divide-by-n circuit 246 supplies a strobe signal to the strobe terminal 52. As previously described, this strobe signal activates the A/D converter 228 and the display units 44, 46 and 50 to cause the inspection system to display the r, $\theta$ and z coordinates at each sampling point 70 of FIG. 2B and couple this information of the computational unit 54.

The upward movement of the probe tip 26 along the axial sampling path 68 of FIG. 2B is halted by a zero comparator 298, which is a conventional comparator circuit interconnected to compare the digial signal supplied by the U/D counter 248 with a digital signal representative of the numeral zero and having its output terminal connected to the S input terminal of the $\theta/z$ flip-flop 274. Thus, as the probe tip 26 reaches the upper terminus of the aperture being inspected (Z=0), the Q and $\overline{Q}$ outputs of the $\theta/z$ flip-flop 274 respectively become a logical one and a logical zero. This causes the output supplied by the AND gate 282 to become a logical zero which activates the inverting amplifier 288 to move the probe 12 into the noncontacting stowed position and removes the input signal from the amplifier 290 to cause the z axis motor 28 to cease turning.

Since the $\theta$ counter 258 contains a count of one during the time in which the probe tip 26 is moved downwardly and then upwardly to gather coordinate information at sampling intervals of $\theta z$ along one axial element of the aperture wall (i.e., downward travel along the paths 64a and upward travel along the path 68a of the scanning sequence depicted in FIG. 2B), a conventional inverter circuit 300, having its input terminal connected for receiving the most significant bit (msb) of the four-bit digital signal supplied by the $\theta$ counter 258, supplies a logical one to the third input terminal of the AND gate 284. Thus, the AND gate 284 supplies a logical one signal to one input terminal of a differential amplifier 302 which is connected for driving the $\theta$ motor 30. Since the second input terminal of the differential amplifier 302 is connected to the output terminal of the AND gate 286 via switch contact 262d and since one input terminal of the AND gate 286 is connected for receiving the most significant bit of the digital signals supplied by the $\theta$ counter 258, it can be seen that the AND gate 286 supplies a logical zero to cause the amplifier 302 to rotate the $\theta$ motor in a clockwise direction.

As previously described relative to the probe manipulator depicted in FIGS. 4–8, the $\theta$ motor 98 operates the Geneva stop mechanism 100 to turn the rotatable platform 82 and profile sensor 10 through the predetermined angle $\Delta\theta$ (45 degrees in the embodiment of the invention being described). Further, as previously described, the $\theta$ increment switch 180 is operated as the Geneva stop mechanism 100 moves the rotatable plate 82 and the profile sensor 10 into its new angular position. As can be seen in FIG. 14, activation of the $\theta$ increment switch 180 triggers a one-shot multivibrator 304 which supplies a pulse signal to the input terminal of the $\theta$ counter 258 and to one input terminal of an AND gate 306 havings its output terminal connected to the second input terminal of the OR gate 270. Since an inverter circuit 308 is connected to supply the second input terminal of the AND gate 306 with the logical negative of the most significant bit the signal supplied by the $\theta$ counter 258, it can be recognized that unless the $\theta$ counter contains a count corresponding to a number equal to or greater than eight, the signal supplied by the one-shot multivibrator 304 increments the $\theta$ counter and resets the $\theta/z$ flip-flop 274. As the $\theta/z$ flip-flop is reset, the output of the AND gate 284 goes from a logical one to a logical zero to terminate the signal supplied to the amplifier 302 to thus deenergize the $\theta$ motor 30.

At this point, the inspection system is ready to gather data along the second axial path of the scanning sequence (i.e., the path 68b in FIG. 2B), the flip-flops 268, 274 and 276 are in the same logic condition as they were at the beginning of the scanning sequence and the $\theta$ counter now contains a count of two. Accordingly, the circuit of FIG. 14 continues to operate in the above-described manner to move the probe tip 26 downwardly to the maximum z position without contacting the aperture wall, allows the probe tip to swing into contact with the aperture wall, moves the probe tip upwardly along the second contacting path of the scanning sequence to gather data at intervals of $\theta z$, moves the probe 12 into the stowed position when the probe tip 26 reaches the upper terminus of the aperture being inspected, and again rotates the profile sensor 10 through the angle $\Delta\theta$ to position the probe tip 26 in alignment with the next axial wall element to be traced out. This automatic operation continues in the above-described manner until the $\theta$ counter reaches a count of eight (1000) and the probe tip 26 is moved downwardly and positioned for tracing out the eighth and final axial element of the aperture being inspected. In particular, when the $\theta$ counter reaches a count of eight, a logical one is coupled to one input terminal of the AND gate 286 and the inverters 300 and 308 effectively disable the AND gates 284 and 306 by supplying a logical zero to one of the input terminals of each of these gates. Thus, when the probe tip 26 reaches the upper terminus of the eighth axial tracing path, the $\theta$ motor 30 does not drive the rotatable plate 82 and profile sensor 10 in the clockwise direction, but through activation of the AND gate 286 supplies a signal to the amplifier 302 which causes the $\theta$ motor to rotate the profile sensor 10 in the counterclockwise direction. As the profile sensor 10 is rotated back toward its initial position by an angle of $\Delta\theta$ the increment switch 180 is operated causing the one-shot multivibrator 304 to supply a signal pulse which increments the $\theta$ counter 58 to a count of nine. Since the logic level of the most significant bit of the digital signal supplied by the $\theta$ counter remains a logical one, the signal supplied by the one-shot multivibrator 304 does not activate the OR gate 270 to reset the $\theta/z$ flip-flop 274. Thus, the AND gate 286 continues to supply a logical one and the amplifier 302 continues to drive the $\theta$ motor 30 in the counterclockwise direction. Operation continues in this manner until the $\theta$ counter attains a count of 15 which occurs when the profile sensor 10 has been rotated to an angular position identical to the position it occupied at the beginning of the inspection scanning sequence. At this time, an AND gate 310 that has its input terminals connected for receiving each bit of the parallel format digital signal supplied by the $\theta$ counter 258 supplies a logical one to one input terminal of an OR gate 312. The output terminal of the OR gate is connected to the reset (R) terminal of the run flip-flop 268 and thus causes the Q output of the run flip-flop 268 to go from a logical one to a logical zero. Since one input terminal of the AND gates 280, 282, 284 and 286 are connected for receiving the Q output of the run flip-flop 268, each of these AND gates are effectively disabled and neither the z axis drive motor 90 nor the $\theta$ drive motor 98 will be energized until the system operator again depresses the scan switch 264.

In addition to the above-described circuitry for automatically moving the probe tip 26 through the scanning sequence of FIG. 2B, the arrangement of FIG. 14 includes conventionally operable manual switch which includes contacts 314a, 314b, 314c and 314d for allowing the inspection system operator to manually control operation of the z axis drive motor 90 and $\theta$ axis drive motor 98. More specifically, setting the automanual switch 262 in the manual (M) position interconnects the input terminals of the amplifier 290 with the switches 314a and 314b and interconnects the two input terminals of the amplifier 302 with the switches 314c and 314d. Since one terminal of each of these switches is connected to an appropriate positive electrical potential, activation of any one of these switches 314 causes either the z axis drive motor 90 or $\theta$ drive motor 98 to operate. For example, when the switches 314a and 314b are operated, the amplifier 290 is supplied with an input signal which respectively causes the z axis motor 90 to move the probe tip 26 downwardly and upwardly and when the switches 314c and 314d are operated, the amplifier 302 is supplied with an input signal which respectively causes the θ motor 98 to rotate clockwise and counterclockwise. The provision of the switch 34 is advantageous in that it permits the system operator to manually operate the inspection system whenever desired or necessary and also permits the operator to place the profile sensor 10 in a desired initial position before beginning an automatic scanning sequence.

As described relative to the basic system arrangement depicted in FIG. 1 and the more detailed embodiment of the invention configured for inspecting apertures such as those for receiving tapered fasteners, r, θ and z coordinate data is made available to the computational unit 54 of the inspection system each time a strobe pulse is applied to the sample strobe terminal 52. Depending on the type of computational unit employed, this data can be utilized to compute geometrical and dimensional characteristics of the aperture being inspected as the data is being gathered, can be stored for appropriate computation after each inspection sequence is complete or can be stored on conventional storage media such as punched cards, punched paper tape or magnetic tape for later processing in another computational device (e.g., "batch process" of data pertaining to a large number of inspected apertures). Further, since the data supplied to the computational unit 54 collectively defines the spatial coordinates of a set of points that correspond to a "skeletial framework" identical to the geometry of the aperture being inspected, the computational unit utilized to process the data can be configured and/or programmed to calculate virtually any desired geometrical or dimensional characteristic of the inspected apertures. For example, in the realization of the invention for evaluating apertures configured for receiving the tapered fasteners, the probe manipulator of FIGS. 4-8 and the electronic circuitry of FIG. 14 were operated in conjunction with a IMSAI 8080 microprocessor, manufactured by the IMSAI Manufacturing Corporation of San Leandro, California, which includes a peripheral keyboard unit that is utilized for interactive executive commands and a tape punch unit that records the coordinate information supplied by the profile sensor 10, the U/D counter 248 and the θ counter 258.

In such an arrangement, a conventional high speed tape reader is utilized to read the recorded coordinate information into the memory units of a minicomputer such as a NOVA III System available from Data General Corporation of Southboro, Massachusetts. The minicomputer, programmed through conventional software techniques to operate in response to command signals initiated by the system operator then performs the arithmetic and logic operations that are required to determine acceptability of the inspected apertures.

Those skilled in the art will recognize not only that a variety of conventional computing devices can be utilized within the inspection system of this invention, but will also recognize that the computational device can be programmed in a variety of manners. In this regard, FIG. 15 depicts one example of a computational sequence that can be utilized in the above-mentioned realization of an embodiment of the invention configured for the inspection of apertures that receive tapered fasteners.

Figure 15:
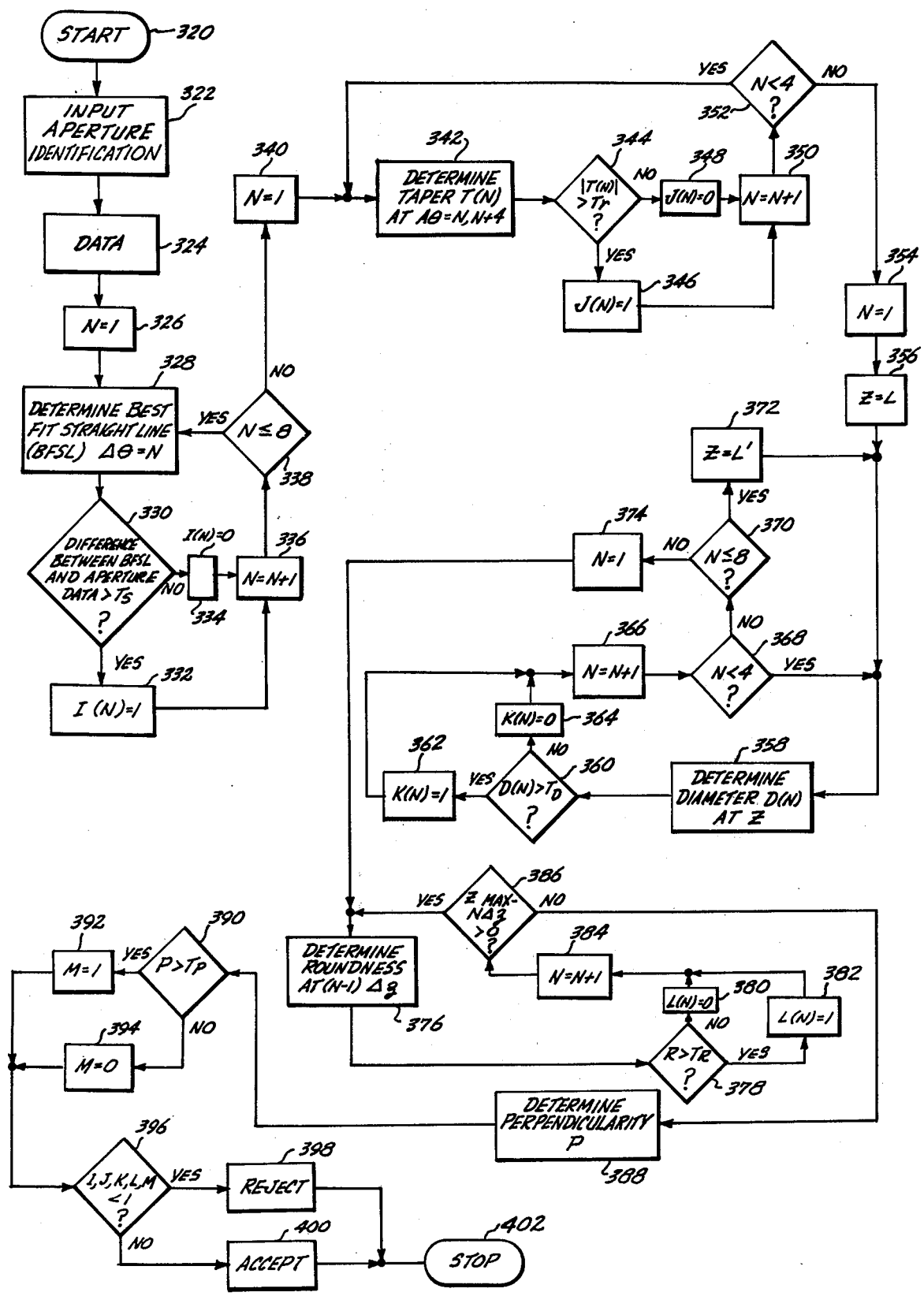

In utilizing the computation sequence of FIG. 15, the coordinate data pertaining to one or more apertures are supplied to the memory units of the computational device and the operator initiates operation of the computerized evaluation sequence by supplying the computational device with a conventional command signal (indicated by the "start" block 320 of FIG. 15). As is indicated at block 322, the operator then supplies the computational device with an identification of the type of aperture being inspected. For example, an indication of the series, group number and/or diameter of the tapered fastener aperture being inspected is supplied to the computational device by means of a conventional keyboard interface unit. This information allows the computational device to access data pertaining to the dimensional requirements that must be met by the aperture, which dimensional requirements are stored within computer memory.

As is indicated at block 324, if desired or necessary, the computational device can be programmed to compensate for various factors that can limit system accuracy. For example, the accuracy of the radial deflection signal supplied by the profile sensor 10 is not only affected by the linearity of the particular profile sensor being utilized, but is also affected by any deviation between the probe manipulator axis of rotation and the axial centerline of the inspected aperture. In this regard, in one realization of the invention it was determined that the deflection-output signal characteristics of the particular profile sensor being utilized were slightly nonlinear and that the perpendicularity of the ball slide 80 relative to the plane of the feet 140 was in error by 0.0007 inch per inch. In this realization of the invention, a correction table reflecting these potential errors was stored in the computational device and the radial coordinate information was corrected prior to calculation of the desired dimensional and geometrical characteristics of an inspected aperture.

Following data compensation, a computational index N is set to an initial value of unity (block 326 in FIG. 15) and a subroutine is executed to determine the mathematical description of a straight line passing through the data samples that lie along an axial element of the aperture being inspected (block 328). Various algorithms and mathematical techniques known to those skilled in the art can be utilized for this determination. For example, the slope and intercept of the best fit approximation to a straight line passing through the collection of data points can be determined by conventional mathematical regression techniques.

Having determined the best fit straight line for points along one axial element of the aperture being inspected (i.e., the sampling path 68a of the scanning sequence depicted in FIG. 2B), the computational device then determines the difference between the calculated best bit straight line and each of the data points lying on that particular axial element of the aperture. As is indicated at block 330 of FIG. 15, this difference is compared to a straightness tolerance $T_S$ and if the deviation between the calculated line and any point lying on the axial element of the aperture exceeds the tolerance, the computational device sets an indicator flag, I(N) equal to one (block 332 of the sequence depicted in FIG. 15). If the difference between the calculated best fit straight line and the aperture coordinates does not exceed the straightness tolerance, the computational device sets the indicator flag I(N) equal to zero (indicated at block 334). Once the indicator flag has been established for a particular axial element being evaluated, the computational index N is incremented by one (block 336) and N is tested to determine whether or not the straigtness characteristics of each axial element of the scanning pattern has been evaluated. More specifically, with respect to the previously described embodiment of the probe manipulator that utilizes an eight-position Geneva stop mechanism, the value of N is compared to eight and if the straightness characteristic of the eighth axial element has not been determined, the computational device sequences to block 328 to determmmine the straightness characteristic of the next axial element. On the other hand, when the straightness characteristics of all eight axial elements have been determined and the results have been stored as an eight element array of the indicator flag I(N), the computational device sequences to block 340 and resets the computational index N to one.

The taper characteristics of the aperture being inspected are determined at block 342 of the depicted sequence by comparing the best fit straight line approximations of two diametrically opposed axial elements of the aperture being evaluated. For example, when the computational index N is equal to one, the best fit straight line approximation to the first and fifth scanning paths 68 of the scanning sequence depicted in FIG. 2B are utilized and the computational unit determines the sum of the absolute values of the slopes associated with these best fit straight line approximations. The taper value, T(N), determined at this step of the operational sequence is then compared with an appropriate taper tolerance $T_T$ at block 344. Depending upon whether or not the calculated taper exceeds the taper tolerance, an indicator flag J(N) is set equal to one or zero (blocks 346 and 348 of the depicted sequence) and the computational index N is incremented by one (block 348). The computational index n is then compared to the value four at decisional block 352 of the depicted operational sequence to repeat the tapered determination at block 352 if all four pairs of diametrically opposed axial elements have not been considered and cause the computational device to again initialize the computational index N to the value one when the taper determination is complete and a four element array containing the four taper flags J(N) has been stored within computer memory.

Next, the computational device is sequenced through a series of operations which calculate the diameter of the tapered fastener aperture being evaluated at each datum L and L' indicated in FIG. 3. In this regard, the depicted computational sequence determines the distance or diameter between each of the four pairs of diametrically opposed axial scanning elements at a depth of L and L' and compares these diameters to the appropriate dimensions of the particular size tapered fastener aperture being evaluated. More specifically, in the depicted arrangement a computational variable Z is initially set equal to the appropriate dimension L at block 356 and the distance between points on the first and fifth axial scanning path that are located at the depth L is determined. In this regard, it can be recognized that the previously described scanning sequence of FIG. 2B may not include data points at this particular depth. However, by utilizing the coordinate information pertaining to the two sampling points adjacent to the depth L and conventional interpolation techniques, the radial component of the coordinate at the depth L can be determined. In a manner similar to that utilized in the previously described sequences for determining straightness and taper characteristics, the first diameter at the depth L is then compared to an appropriate dimensional tolerance, $T_D$ at block 360 of the operational sequence and an indicator flag K(N) is set equal to one or zero at blocks 362 and 364 to indicate whether or not the diameter being evaluated is within the desired tolerance and the computational index N is incremented by one (block 366 of the depicted sequence). Next the computational index N is compared to four (block 368) and the sequence is repeated until the four diameters at the depth L have been evaluated. When all four diameters at the depth L have been evaluated, the computational index N is equal to five and the decisional block 368 sequences the computational unit to decisional block 370 which compares the value of N with eight. If N is equal to or less then eight, the variable z is set equal to the appropriate dimension L' (at block 372) and the computational device is sequenced through block 358 to thereby determine the distance between oppositely disposed pairs of the eight scanning paths at the depth L'. During this portion of th sequence, the indicator flag K(N) for N=5, 6, 7, 8 is set equal to zero or one depending upon whether or not the corresponding diameter is within the tolerance specified in decisional block 360. When each of the four diameters at the depth L' have been evaluated, N is equal to nine and decisional block 370 causes the computational device to sequence to block 374 which resets N to one.

The computational device is then sequenced to block 376 which represents a subroutine for determining the roundness characteristic of the aperture being evaluated. One example of such a subroutine simply entails determining the difference between the minimum and maximum diameter values at various axial positions along the aperture being evaluated. For example, as is indicated in FIG. 15, the roundness characteristic can be determined in each cross-sectional plane which includes a signal sample by utilizing the computational index N, determining the roundness characteristic at the axial position (N-1) $\Delta z$ and then incrementing N over a range which includes the number of signal samples taken along each axial element of the scanning pattern. In particular, as the roundness is determined at a particular position along an axial element of the scanning pattern, the difference between the maximum and minimum diameters is compared to a roundness tolerance at decisional block 378 and a roundness flag R (N) is set equal to zero or one depending upon whether or not the difference between the maximum and minimum diameters is greater than or less than the appropriate tolerance (blocks 380 and 382 of the sequence depicted in FIG. 15). The computational index N is then incremented by one at block 384 and the quantity $N\Delta z$ is compared to the selected maximum axial penetration of the profile sensor probe tip, $Z_{max}$, at block 386 to determine whether or not the roundness characteristic has been evaluated at each depth where signal samples were obtained. If an evaluation has not been made at each of the depths that were sampled during the inspection scanning sequence, the computational device is again sequenced to block 376. On the other hand, if the evaluation of aperture roundness is complete, the computational device is sequenced to block 388 to determine the perpendicularity of the aperture being evaluated.

Evaluation of aperture perpendicularly can be accomplished through several relatively simple mathmetical subroutines. For example, one satisfactory technique is to determine one-half the difference between the slope values obtained for each pair of oppositely disposed axial scanning elements, such information being readily available from the previously described subroutines in which the computational device determines the straightness of the eight axial scanning elements and the taper of oppositely disposed pairs of axial scanning elements. Once such a value is determined, it is compared with an appropriate perpendicularity tolerance, $T_p$, at decisional block 390. If the perpendicularly of the aperture being evaluated is less than the perpendicularity tolerance (e.g., is with 2° of being perpendicular) a perpendicularity indicator M is set equal to zero at block 392. On the other hand, if the aperture being evaluated does not meet the perpendicularity tolerance, the indicator M is set equal to one at block 394. The computational device is then sequenced to decisional block 396.

In view of the above-described computational sequence depicted in FIG. 15, it can be recognized that, when the computational device is sequenced to decisional block 396, the previously described indicator arrays I, J, K. L and the indicator M collectively constitute an array of zeros and ones that indicate whether or not each of the evaluated dimensional and geometrical characteristics are within tolerance. Thus, by sequentially comparing each of these indicators with the quantity one, it can be determined whether or not the aperture is to be accepted or rejected. In this respect, it is often preferably to individually and sequentially test each of the indicators and activate a reject subroutine (block 398) whenever one of the characteristics are not within the specified tolerance. Such a reject subroutine can cause the computational device to provide a hard copy printout or other desired display indicating the particular dimensional characteristic that is not within tolerance. On the other hand, if each of the evaluated characteristics is within the stated tolerances, the computational device is sequenced to an acceptance subroutine (indicated at block 400) that causes an indication that the aperture being evaluated meets each inspection criteria. Following completion of the rejection and acceptance subroutines, the computational device is sequenced to a "stop" or hold mold (indicated at block 402) where it remains until new inspection data is made available by the probe manipulator and manipulator control/signal processing unit and the operator initiates another evaluation routine.

It will be recognized by those skilled in the art that the embodiments of the invention depicted and described herein are exemplary in nature and that many variations are possible without exceeding the scope and spirit of this invention. For example, as previously described, various computational arrangements which are known to those skilled in the art are suitable for the practice of this invention. Further, in some situation, the computational device employed can be configured or programmed to implement at least a portion of the motor control logic described relative to FIGS. 1 and 14. Additionally, various changes can be made in the probe manipulator described herein such as utilizing a lead screw and rotating nut drive to replace the described rack and pinion assembly, and/or replacing the Geneva stop mechanism with a gear and pinion.

The embodiments of the invention in which an exclusive property or privilege is claimed are defined as follows:

1. An inspection system for the evaluation of selected dimensional and geometrical characteristics of an aperture within a production part, said inspection system comprising:
    profile sensor means having a displaceable probe means, said profile sensor means for supplying a first electrical signal representative of the displacement of said probe means;
    probe manipulator means including a platform having a plurality of downwardly extending legs that are dimensioned and arranged for positioning said platform above an aperture which extends downwardly into a production part with said platform transverse to the axial centerline of said aperture, said probe manipulator further including a rotatable plate mounted to said platform and a slide assembly extending vertically upward from said rotatable plate, said slide assembly including probe mounting means for affixing said profile sensor means in at least one predetermined position relative to the center of rotation of said rotatable plate, said rotatable plate and said platform including a central opening for passage of said profile sensor probe means, said probe manipulator means further including first drive means for rotating said rotatable plate to move said probe means angularly about the cross-sectional periphery of an aperture being inspected and second drive means for moving said probe mounting means upwardly and downwardly relative to said platform to move said probe means inwardly and outwardly through said aperture being inspected with said probe means contacting the interior boundary wall of said aperture being inspected during at least a predetermined portion of said inwardly and outwardly movement to cause said first electrical signal to be representative of the radial coordinate of the point on said aperture boundary wall that is contacted by said probe means, said probe manipulator means further including means for supplying a second and third electrical signal respectively representative of the angular coordinate and the axial coordinate of said point on said aperture boundary wall that is contacted by said probe means relative to a coordinate system established by the orientation between said probe manipulator means and said aperture being inspected; and,
    circuit means for activating said first and second drive means of said probe manipulator means to move said profile sensor probe means through a predetermined scanning sequence in which said probe means traces out a predetermined scanning pattern along said aperture boundary wall, said circuit means including means for receiving said first, second and third electrical signals and for periodically supplying a first spatial coordinate signal representative of the radial dimension of said aperture at a plurality of sampling points along said scanning pattern and second and third coodinate signals representative of the angular and axial position of each of said sampling points.

2. The inspection system of claim 1 wherein said probe manipulator means further includes probe storage means for placing said probe means in a position at which said probe means does not contact said aperture boundary wall, said circuit means including means for activating said probe storage means during predetermined portions of said scanning sequence.

3. The inspection system of claim 2 wherein said circuit means includes means for first operating said probe manipulator second drive means to move said probe means axially into said aperture being inspected for a predetermined maximum distance and then withdrawing said probe means along an axial element of said aperture boundary wall and wherein said circuit means includes means for rotating said rotatable plate through a predetermined angle Φ to incrementally move said probe means about the periphery of said aperture being inspected each time said probe means has been withdrawn along an axial element of said aperture boundary wall, said means for activating said probe storage means automatically placing said probe in said noncontacting position during all portions of said scanning sequence except when said probe manipulator is being withdrawn along with axial elements of said aperture boundary wall.

4. The inspection system of claims 1 or 3 further comprising computational means for receiving said first, second and third coordinate signals, said computational means including means for computing the actual value of at least one geometrical and dimensional characteristic of said aperture being inspected and means for comparing each computed actual value of a geometrical and dimensional characteristic with a predetermined nominal value to provide an indication of the acceptability of said aperture being inspected.

5. The inspection system of claims 1 or 3 wherein said second drive means includes a first reversible DC motor and a rack and pinion assembly, said first reversible DC motor being operatively linked to said slidable member by said rack and pinion assembly for moving said probe mounting means and said profile sensor means upwardly and downwardly in response to first and second axial command signals supplied by said circuit means.

6. The inspection system of claim 5 wherein said means for supplying said third electrical signal includes a rotary encoder operatively interconnected with said rack and pinion assembly to rotate in a first direction when said probe means is moved downwardly and to rotate in a second direction when said probe means is moved upwardly, said rotary encoder supplying at least one electrical signal indicative of the direction of rotation and including a signal pulse each time said probe tip is moved up and down by a predetermined amount.

7. The inspection system of claim 6 wherein said means for supplying said axial coordinate signal includes first counter means responsive to said signals supplied by said rotary encoder for storing a signal representative of the axial coordinate of said probe means, said first counter means incrementing said stored count in response to each signal pulse supplied by said rotary encoder when said rotary encoder is rotated in said first direction and to decrement said signal stored in said first counter means when said rotary encoder is rotated in said second direction.

8. The inspection system of claim 7 wherein said probe manipulator means further includes indexing means for supplying a reset signal to said first counter means to reset said first counter means to a predetermined count that corresponds to a particular axial coordinate within said aperture being inspected, said indexing means including means for supplying said reset signal each time said probe means passes through said particular axial coordinate.

9. The inspection system of claim 7 wherein said inspection system further comprises a selection means for supplying a signal representative of a selected maximum axial penetration of said probe means into said aperture being inspected and said circuit means includes first comparator means responsive to said signals supplied by said selector means and said signal stored within said first counter means, said first comparator means for supplying a first interrupt signal to said first DC motor for stopping downward movement of said probe means each time said probe means reaches said maximum axial penetration.

10. The inspection system of claim 9 wherein said circuit means includes second comparator means responsive to said count signals stored in said first counter means for comparing said count signal with a signal representative of the axial coordinate of the upper termination of said aperture being inspected, said second comparator means for supplying a second interrupt signal to said first DC motor for stopping upward movement of said probe means when said probe means reaches said upper terminus of said aperture being inspected.

11. The inspection system of claim 7 wherein said rotatable plate of said probe manipulator means includes a central annular region extending downwardly through said platform and said first drive means includes a Geneva stop mechanism and a second reversible DC motor, said Geneva stop mechanism being mounted to said downwardly extending annular region of said rotatable plate and the lower surface of said platform, said second DC motor being operatively interconnected with said Geneva stop mechanism to move said rotatable plate and said profile sensor through a predetermined angle Φ in in response to an annular command signal supplied by said circuit means.

12. The inspection system of claim 11 further comprising a programmable divide-by-n counter and means for selecting the divisor n of said divide-by-n counter, said divide-by-n counter being connected for receiving said signal pulses supplied by said rotary encoder when said probe means is moved upwardly, said divide-by-n counter for supplying a single signal pulse each time said rotary encoder supplies, a group of n signal pulses during upward movement of said probe means, said circuit means further including means for supplying said first and third coordinate signals each time said divide-by-n counter supplies one of said single signal pulses.

13. The inspection system of claim 12 wherein said probe manipulator means further includes switching means mounted to said platform of said probe manipulator means in a position in which said switch is activated each time said second DC motor moves said rotatable plate through said predetermined angle Φ, said inspection system further comprising second counter means response to said switch means for storing a signal representative of the angular position of said rotatable platform and said profile sensor.

14. The inspection system of claim 13 wherein said circuit means includes logic means responsive to said signals supplied by said first and second comparator means and responsive to said signals stored by said second counter means, said logic means supplying said first axial command signal each time an inspection sequence is initiated, said logic means interrupting said first axial command signal and supplying said second axial command signal when said first comparator means supplies said first interruption signal, said logic means interrupting said second axial command signal and supplying said first angular command signal when said second comparator means supplies said second interruption signal, said logic means further including means responsive to the count signal contained in said second counter means for again supplying said first axial command signal when said count signal stored in said second counter means is less than a first predetermined number and means for repetitively supplying a second angular command signal to said second DC motor for rotating said motor in a direction opposite to the direction of rotation caused by said first angular command signal when said count signal stored in said second counter means is greater than said first predetermined number, said logic circuit means continuing to supply said second angular command signal until said count signals stored in said second counter means corresponds to a second predetermined number, said logic means further including means for interrupting operation of said first and second DC motors when said count signals stored in said counter means corresponds to said second predetermined number.

15. The inspection system of claim 14 further comprising means for storing said first, second and third coordinate signals supplied by said circuit means each time said divide-by-n counter supplies one of said single signal pulses and computing means operational for deriving at least one geometrical and dimensional characteristic of each inspected aperture, said computing means being further operative for comaring each derived geometrical and dimensional characteristic with an associated predetermined nominal value to supply an indication of the acceptability of each of said inspected apertures.

* * * * *

UNITED STATES PATENT AND TRADEMARK OFFICE
CERTIFICATE OF CORRECTION

PATENT NO. : 4,167,066
DATED : September 11, 1979
INVENTOR(S) : Cooper et al.

It is certified that error appears in the above-identified patent and that said Letters Patent are hereby corrected as shown below:

Column 6, line 61: "is" is changed to —are—.

Column 7, line 59: "is" ischanged to —are—.

Column 10, line 47: "setforth" is changed to —set forth—.

Column 12, line 54: "rotatable" is changed to —rotatably—.

Column 16, line 61: "manupulator" is change to —manipulator—.

Column 19, line 30: "A/d" is changed to —A/D—.

Column 20, line 56: "supplies" is changed to —supplied—.

Column 22, line 19: "is" is changed to —are—.

Column 22, line 60: "258; is" is changed to —258, is—.

Column 22, line 61: "268; and" is changed to —268, and—.

Column 23, line 46: "to to" is changed to —to—.

Column 23, line 66: "digial" is changed to —digital—.

Column 24, line 5: "is" is changed to —are—.

Column 24, line 41: "drive" is changed to —divide—.

Column 24, line 42: "cunter" is changed to —counter—.

Column 24, line 56: "digial" is changed to —digital—.

Column 30, line 16: "th" is changed to —the—.

UNITED STATES PATENT AND TRADEMARK OFFICE
CERTIFICATE OF CORRECTION

PATENT NO. : 4,167,066

DATED : September 11, 1979

INVENTOR(S) : Cooper et al.

It is certified that error appears in the above-identified patent and that said Letters Patent are hereby corrected as shown below:

Column 31, line 17: "K.L" is changed to —K,L—.

Column 31, line 24: "preferably" is changed to —preferable—.

Column 32, line 53: "coodinate" is changed to —coordinate—.

Column 34, line 27: "in in" is changed to —in—.

Column 34, line 48: "response" is changed to —responsive—.

Column 36, line 10: "comaring" is changed to —comparing—.

On the title page, Item /75/ "Glenn A. Geitham" should read -- Glenn A. Geithman --.

Signed and Sealed this

Eleventh Day of December 1979

[SEAL]

Attest:

SIDNEY A. DIAMOND

Attesting Officer

Commissioner of Patents and Trademarks